United States Patent [19]
Spratt et al.

[11] Patent Number: 6,023,968
[45] Date of Patent: *Feb. 15, 2000

[54] REAL-TIME TWO-DIMENSIONAL RESISTANCE AND PULSATILITY MAPPING

[75] Inventors: Ray Steven Spratt, San Jose; Gregory Sharat Lin, Fremont; Steven F. Forestieri, Santa Clara, all of Calif.

[73] Assignee: Diasonics Ultrasound, Inc., Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/561,887

[22] Filed: Nov. 22, 1995

Related U.S. Application Data

[63] Continuation-in-part of application No. 08/518,146, Aug. 23, 1995, abandoned.

[51] Int. Cl.[7] .................................................. G01F 1/68
[52] U.S. Cl. .................................. 73/204.14; 73/861.25
[58] Field of Search ........................ 73/861.25, 204.14, 73/619, 621

[56] References Cited

U.S. PATENT DOCUMENTS

| | | | |
|---|---|---|---|
| 4,103,679 | 8/1978 | Aronson | 73/861.25 |
| 4,562,843 | 1/1986 | Djordjevich et al. | 128/627 |
| 4,609,872 | 9/1986 | O'Donnell | 324/306 |
| 5,038,788 | 8/1991 | Satake | 73/861.25 |
| 5,058,593 | 10/1991 | Forestieri et al. | 128/661.07 |
| 5,208,785 | 5/1993 | Brumley et al. | 73/170.13 |
| 5,409,010 | 4/1995 | Beach et al. | 73/861.25 |
| 5,443,071 | 8/1995 | Banjanin et al. | 73/861.25 |
| 5,477,859 | 12/1995 | Engeler | 73/626 |
| 5,628,321 | 5/1997 | Scheib et al. | 128/661.08 |

*Primary Examiner*—Max H. Noori
*Attorney, Agent, or Firm*—Blakely, Sokoloff, Taylor & Zafman LLP

[57] ABSTRACT

A method and apparatus for determining resistance and pulsatility indices of a flow of material, such as the flow of blood in the human body. This may be implemented, for example, in a color flow module in an ultrasonic imaging system for display of the pulsatility or resistance index in two dimensions and in different colors to allow discrimination between veins and arteries and detection of pathologic elevation of vascular resistance in a clinical survey mode of the system. The resistance index is determined from the ratio of a unipolar variation estimate of a velocity of the flow material divided by a peak velocity. The variation estimate may be one of the following: a difference between a peak velocity of the flow of material and a second minimum (if unipolar) or negative (if bipolar) velocity of the flow of material, a standard deviation ρ of the velocity of the flow of material, a square root of a value at a first peak of an autocorrelator of the velocity of the flow of material, and a square root of a value at a second peak of the autocorrelator of the velocity of the flow of material.

8 Claims, 19 Drawing Sheets

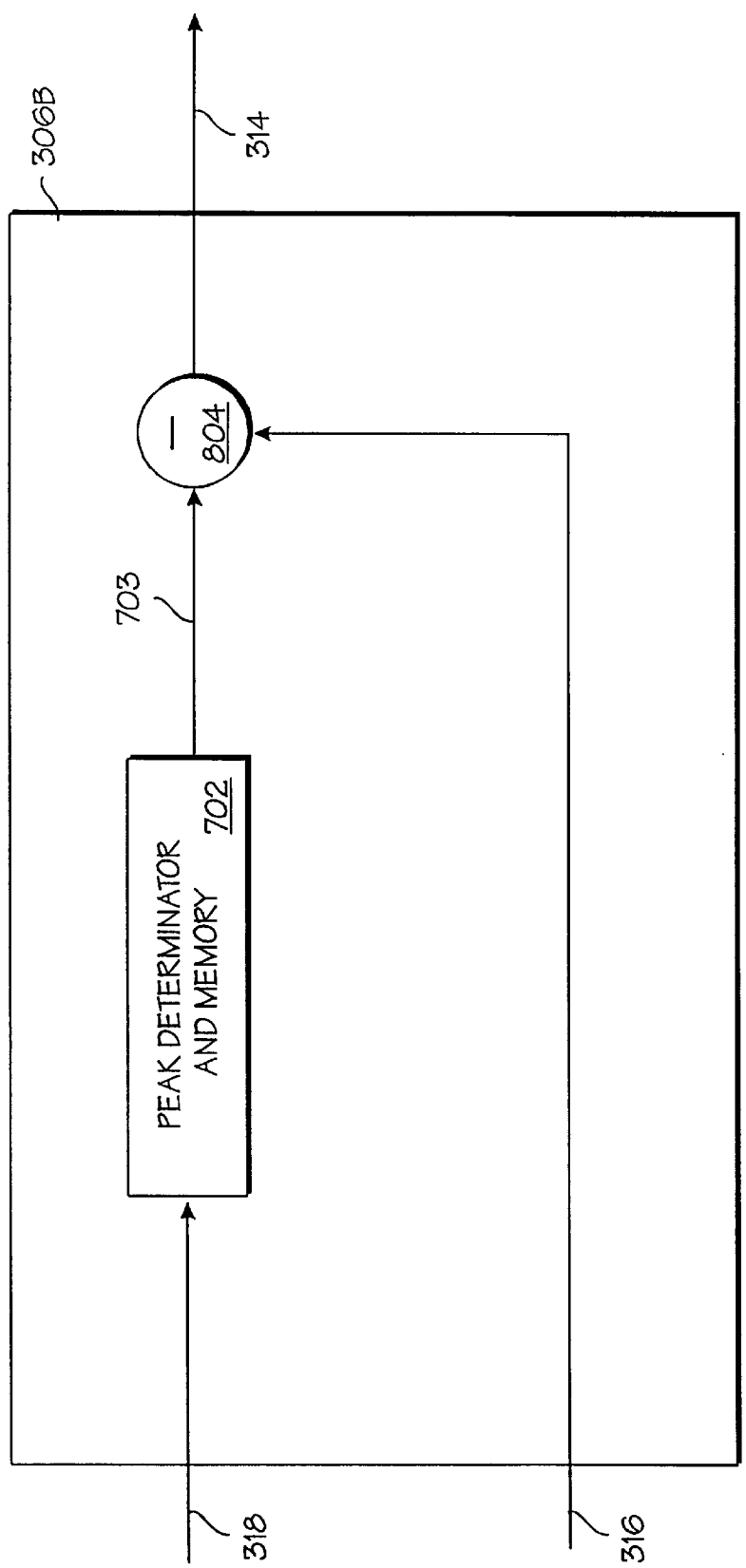

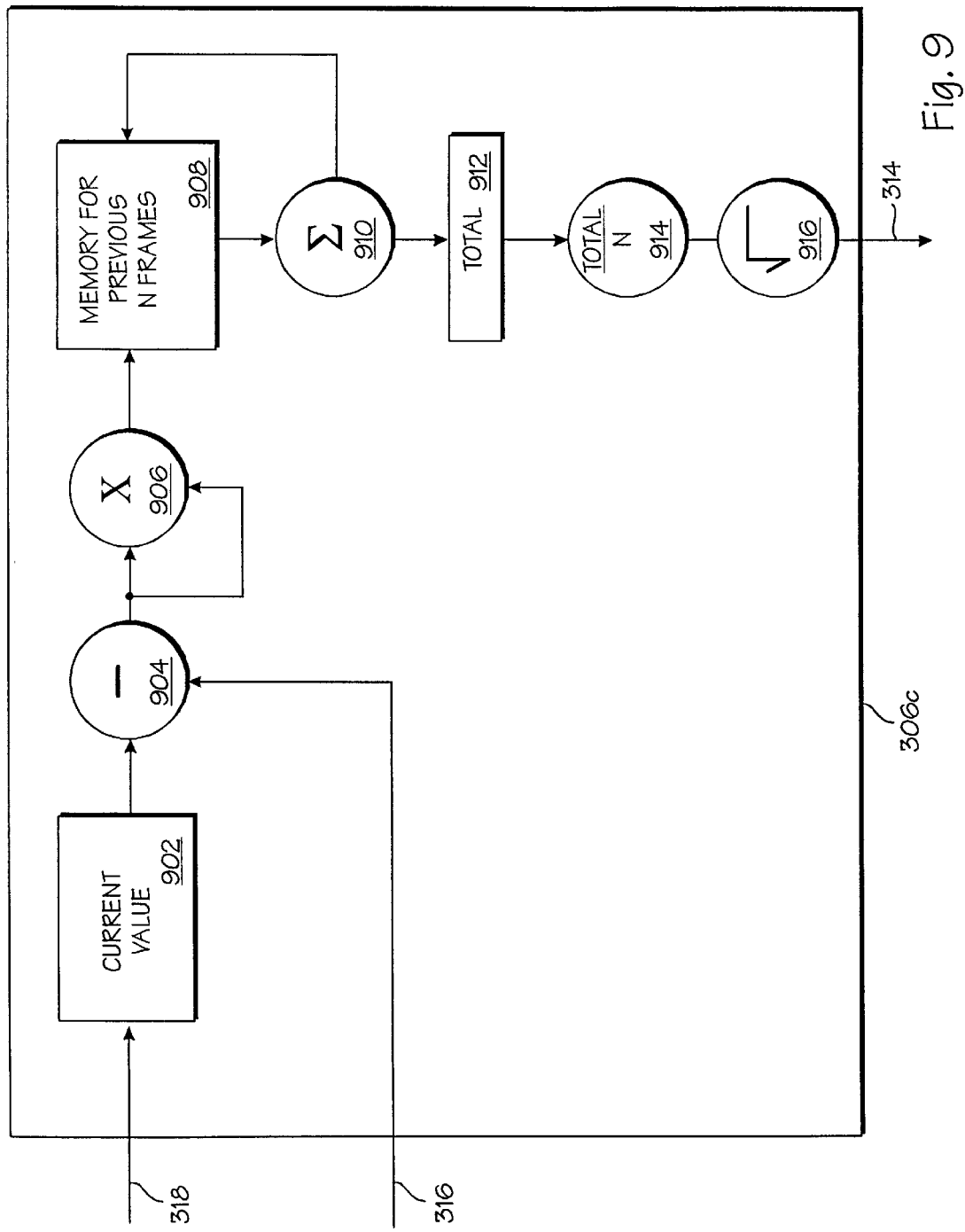

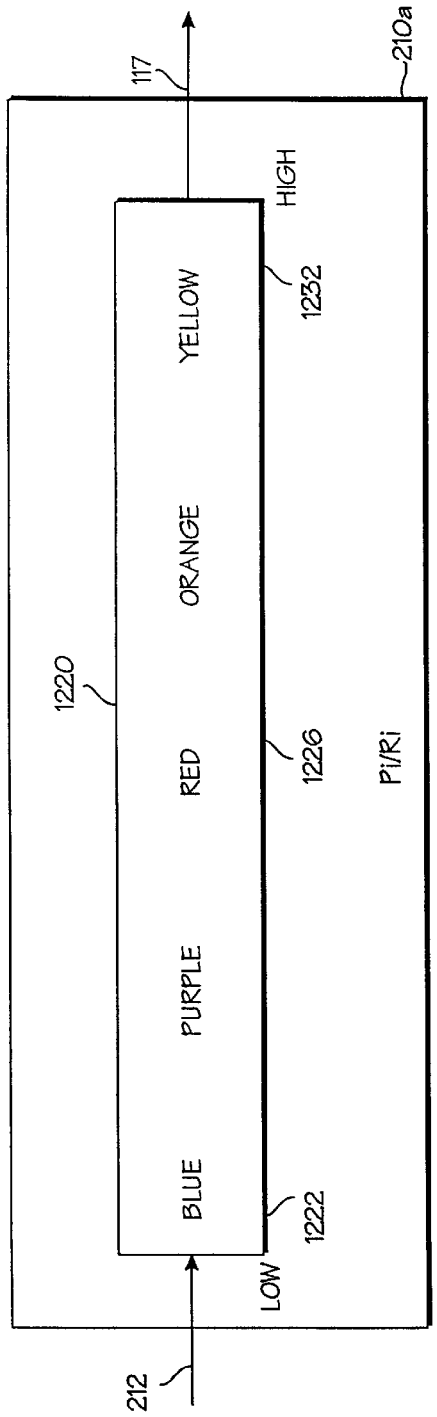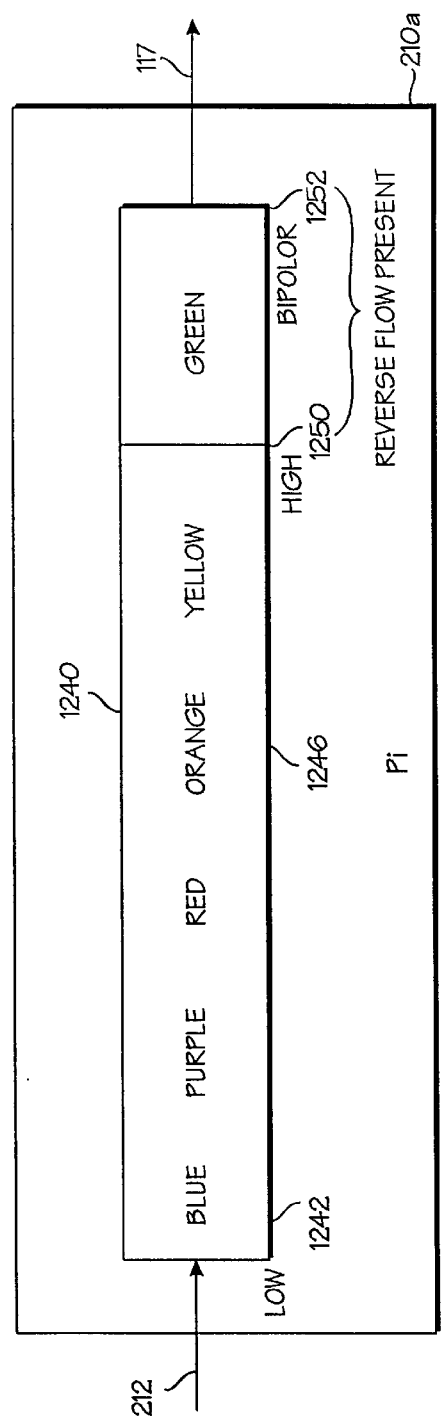
Fig. 12b
Fig. 12c

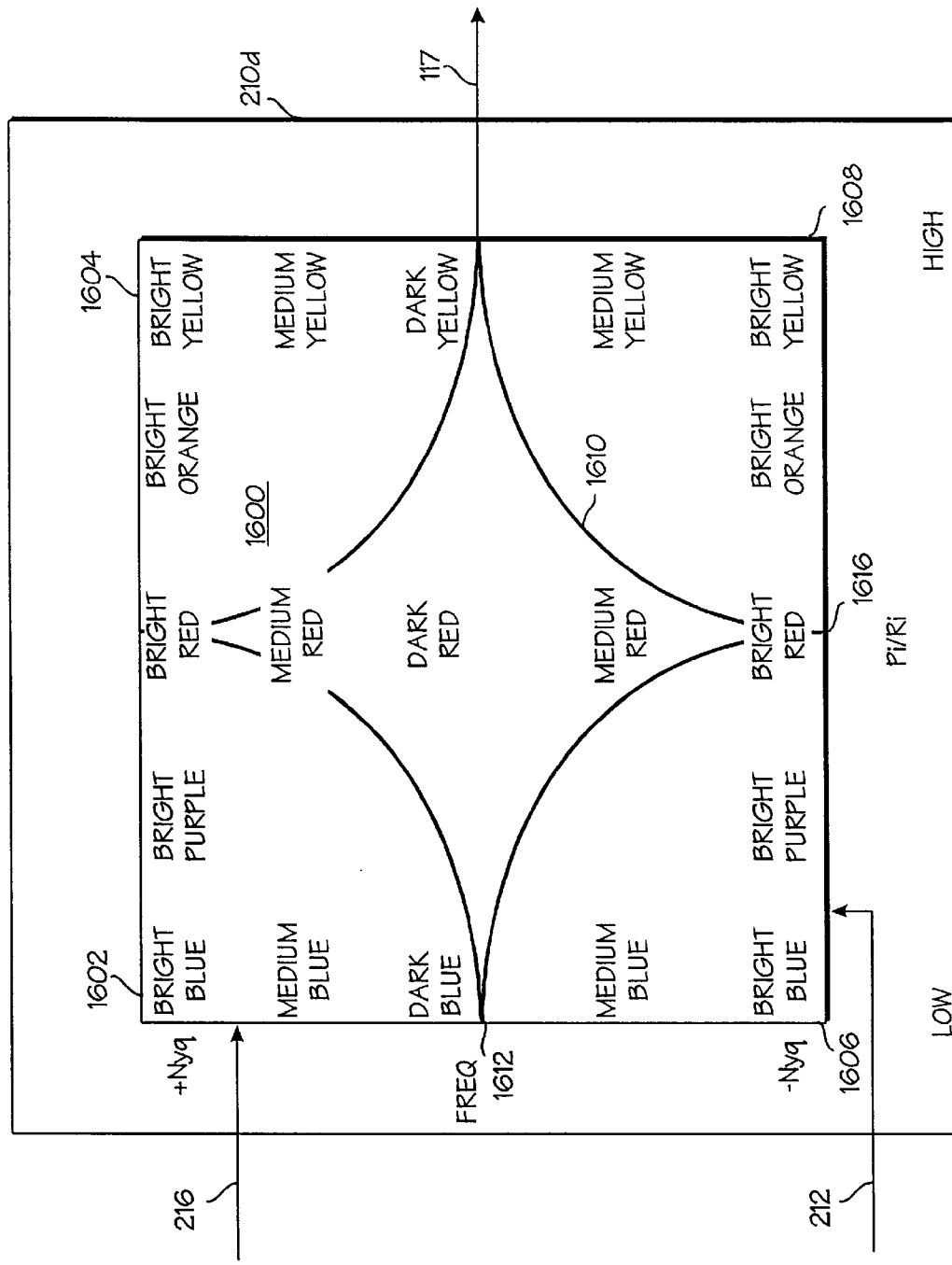

REAL-TIME TWO-DIMENSIONAL RESISTANCE AND PULSATILITY MAPPING

CROSS-REFERENCE TO RELATED APPLICATIONS

This is a continuation-in-part of U.S. application Ser. No. 08/518,146 filed Aug. 23, 1995, by Spratt, et al., which is abandoned now.

BACKGROUND OF THE INVENTION

1. Field of the Invention

The present invention relates to signal processing. More specifically, the present invention relates to a method and apparatus for the determination of pulsatility and resistivity in blood vessels of living subjects.

2. Background Information

New modalities have been developed for ultrasonic imaging systems in recent years. Specifically, certain "state of the art" systems include a mode wherein a real-time angiography study of a subject under examination maybe performed. Angiography, or the two-dimensional mapping of blood vessels, is a useful technique for diagnosing a variety of pathologies.

One shortcoming of ultrasound angiography techniques is that there is currently no easy way to discriminate between veins and arteries independent of the angle between the direction of flow and Doppler interrogation. This is because ultrasound angiography signals are based upon the power of the processed signal. The power of the processed signal provides no way to discriminate veins from arteries in a living subject because the it is roughly equivalent in both veins and arteries.

One prior approach to discriminating between veins and arteries using color flow Doppler is to look at the sign of the velocity (i.e., direction of flow). This technique is scan orientation-dependent and is therefore subject to error. It also fails in the presence of aliasing. Examination of the velocity waveform in single gate Doppler can discriminate between arteries and veins. This is inconvenient because typical Doppler methods examine only one sample volume at a time. Current systems lack the capability of displaying a two-dimensional region with the arteries and veins clearly discriminated.

Prior art methods of discriminating between veins and arteries using ultrasonic imaging systems has been lacking. Such prior art techniques typically require substantial user intervention (e.g., the moving of the ultrasonic probe during scanning), and moreover, often do not accurately distinguish between veins and arteries. Thus, improved means for distinguishing between veins and arteries in an ultrasonic imaging system, such as in a system capable of performing color studies, is desired.

Furthermore, existing methods provide no information on the spatial distribution of clinically important hemodynamic parameters, such as pulsatility index (PI) and resistance index (RI), both of which have been useful in diagnosing vascular disease and impairment of blood perfusion.

SUMMARY OF THE INVENTION

A method and apparatus for determining resistance and pulsatility indices of a flow of material, such as the flow of blood in the human body. This may be implemented, for example, in a color flow module in an ultrasonic imaging system for display of the resistance or pulsatility index in two dimensions and in different colors to allow discrimination between veins and arteries in a clinical survey mode of the system. The resistance index is determined from the ratio of a unipolar variation estimate of a velocity of the flow material divided by peak velocity. The pulsatility index is determined from the ratio of a unipolar or bipolar variation estimate of a velocity of the flow of material divided by an average estimate of the velocity of the flow of material.

The variation estimate may be one of the following: a difference between a peak velocity of the flow of material and minimum (if unipolar) or negative (if bipolar) velocity of the flow of material; a standard deviation $\rho$ of the velocity of the flow of material; a square root of a value at a first peak of an autocorrelator of the velocity of the flow of material; and a square root of a value at a second peak of the autocorrelator of the velocity of the flow of material.

Different average measures may be used, including, a mean velocity of the material, a median velocity of the material, and a root mean squared (RMS) velocity of the material.

Different ranges of the resistance or pulsatility index may be detected in order to display the index in different colors. For example, a first range of resistivity may be detected, which is a range of resistance in a flow of blood in a vein. A second range may also be detected, for example, a range of resistance in a flow of blood in an artery.

In implemented embodiments, a power estimate of a signal representing the flow of material may be generated, and the display may further include displaying the locations of the sampled points of the flow of material in different colors according to the ranges of the resistance index or pulsatility index and the power of the signal. Alternatively, a velocity of the flow of material may be generated, and the display may further include displaying the locations of the sampled points of the flow of material in different colors according to the ranges of the pulsatility or resistance index and the velocity of the flow of material. Thus, discrimination between veins and arteries may be accomplished by the determination of a resistance index or pulsatility index, and the two-dimensional display thereof. Similarly, the method may be used to discriminate between vascular bodies of higher and lower resistance.

BRIEF DESCRIPTION OF THE DRAWINGS

The present invention is illustrated by way of example and not limitation in the figures of the accompanying in which like references indicate like elements and in which:

FIG. 8 shows another embodiment of a variance calculator.

FIG. 9 shows yet another embodiment of a variance calculator.

FIGS. 10b and 10c show different details of different embodiments of the variance calculator illustrated in 10a.

FIGS. 12a through 16 show different embodiments of a color assignment circuit for assigning a color based upon a pulsatility or a resistance index, and in some embodiments, other criteria.

DETAILED DESCRIPTION

The present invention describes an ultrasound imaging system which displays and discriminates between venous and arterial flow in a living subject on a two-dimensional display. This is performed by the determination of an estimated pulsatility/resistance index which is used to determine a color to be displayed at least one for veins and another for arteries. Although the present invention will be described with reference to certain specific embodiments, such as specific hardware components, signals, etc., in order to provide a thorough understanding of the present invention, it will be obvious to one skilled in the art that these specific details may not be required to practice aspects of the instant invention. In some instances, well known components have not been described in detail in order to not unnecessarily obscure the present invention. Although the present techniques will be specifically described with reference to the discrimination between venous and arterial flow in a living subject under examination by an ultrasonic imaging system, it can be appreciated by one skilled in the art that these techniques may also be applicable to the determination of variance in other signal processing fields.

Figure 1:
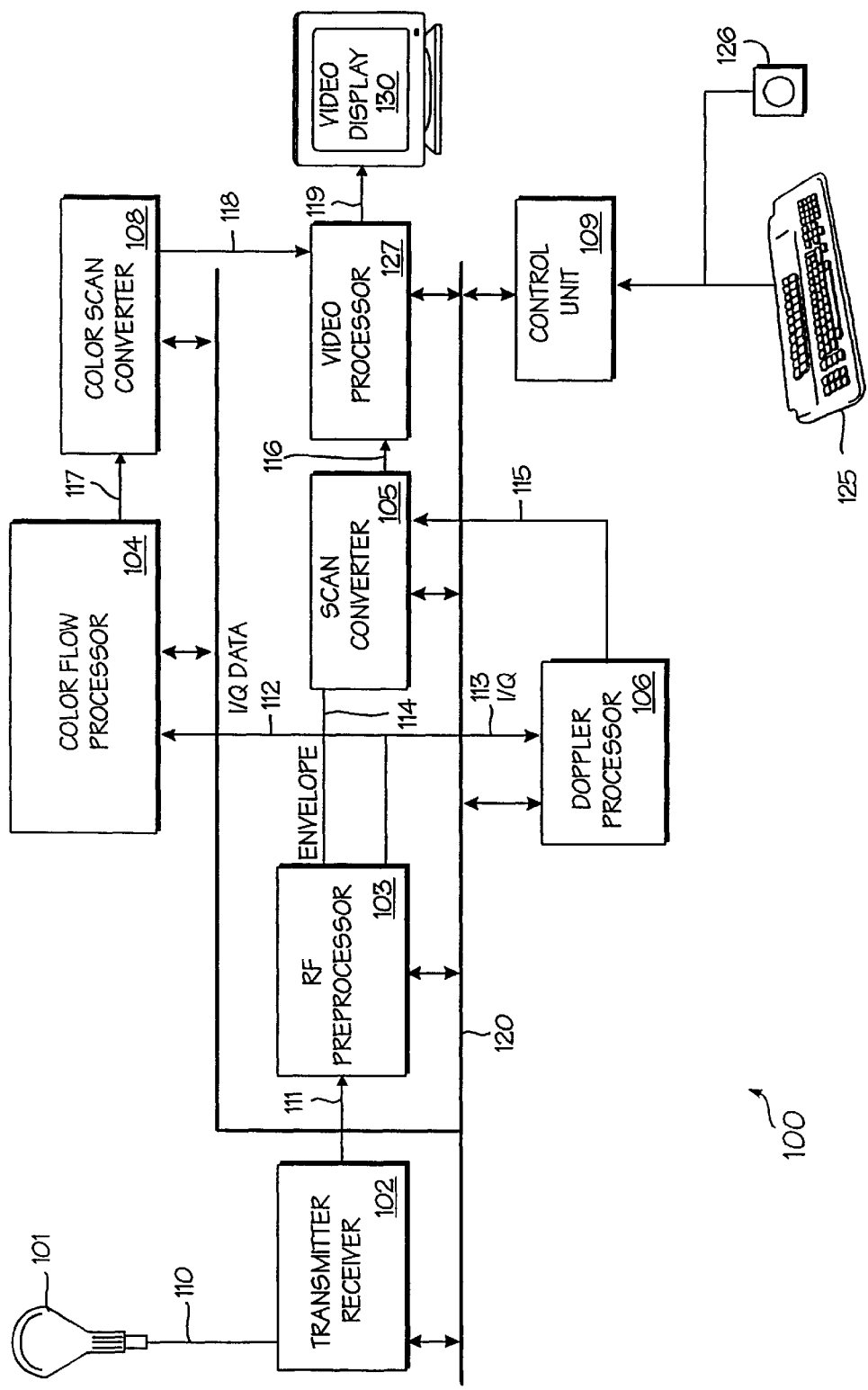
FIG. 1 illustrates an ultrasonic imaging system in which embodiments of the present invention maybe implemented.

One embodiment of the present invention resides in an ultrasonic imaging system, such as illustrated in FIG. 1. Color flow processor 104 illustrated in FIG. 1 may include a programmable color flow processor comprising a plurality of Digital Signal Processors (DSP's) and associated circuitry, such as described in Applicant's prior U.S. Pat. No. 5,058,593. Various embodiments of the present invention may be implemented in discrete hardware components or, alternatively, in programmed processing units such as digital signal processors using software which is compiled and linked and loaded from disk space storage for execution at run-time. Various programs containing the methods employed in these embodiments may also reside in firmware components or other similar nonvolatile storage means.

For example, a typical ultrasound system for color Doppler imaging is shown in FIG. 1 as imaging system 100. Imaging system 100 generally comprises a probe 101, which is typically a multi-element array of one hundred or more piezoelectric elements which both send and receive ultrasound signals when examining the human body. Probe 101 is coupled via signal path 110 to transmitter/receiver circuitry 102, which is designed according to principles well known in the ultrasound imaging art and for purposes of brevity will not be discussed in detail here.

Transmitter/receiver circuitry 102 is coupled to a control unit 109 via bus 120 and is controlled so that the elements in probe 101 are focusing at particular points in the body, both on transmit and receive. Transmitter/receiver circuitry 102 and control unit 109 also often provide a scanning function such that a two-dimensional image may be generated without moving probe 101 with respect to the body.

Following transmission of ultrasound signals into the body, reflected signals are processed by a receiver (which is typically known as a beam former) in transmitter/receiver circuitry 102 and the multitude of signals from each individual element of probe 101 are converted into a single signal which is sent to RF (Radio Frequency) processor 103 via signal path 111.

RF processor 103, also under the control of control unit 109 via bus 120, processes the signal information to produce a detected and unipolar envelope signal and in-phase (I) and quadrature (Q) Doppler signals. The envelope signal represents the amplitude of echoes returning from the body and is further transmitted via signal path 114 to a scan converter 105 which is a typically a large electronic memory, also well known in the art.

Scan converter 105, also under the control of control unit 109 via bus 120, stores the envelope echo information on a line by line basis together with the geometrical position of such information in the body resulting from the scanning process, in such a manner that a two-dimensional video image may be constructed and transmitted to video processor 127 via signal path 116. Video processor 127 is also under the control of control unit 109 via bus 120.

In the absence of any color Doppler information, video processor simply sends a conventional video signal over signal path 119 to video display monitor 130. This two-dimensional image, usually black and white, represents the distribution of echo generating sites within the body. The so-called B-scan image is thus used by the operator to search the body for pathology or by the physician in developing a diagnosis.

I and Q signals for so-called single-gate Doppler are sent to Doppler processor 106 via signal path 113. Doppler processor 106, under the control of control unit 109 via bus 120, using signal processing methods well known in the art, compares signals from several successive echoes to determine the Doppler shift in a single region in the body which is commonly known as the sample volume. Doppler processor 106 also typically produces a continuous time series of spectral Doppler information in which blood flow velocities are displayed in black and white on video display 130 over one or more cardiac cycles (typically several seconds), having first been sent to scan converter 105 via signal path 115, to video processor 127 via signal path 116 and to video display 130 over signal path 119.

Finally, the third path to video display 130 is the color Doppler path in which various embodiments of the present invention may effect the signal, as discussed below.

RF processor 103 transmits I and Q signals via signal path 112 to color flow processor 104 which is also controlled by control unit 109 via bus 120. Color flow processor 104 typically processes several Doppler sample volumes along a given scanning direction in the body.

Color flow processor passes signals to color scan converter 108, also under the control of control unit 109 via bus 120, via signal path 117 where, in a manner similar to the black and white scan converter 105, color encoded signals are stored on a line by line basis, together with the geometrical position of such information in the body resulting from the scanning process, in such a manner that a two-dimensional color video image may be constructed and transmitted to video processor 127 via signal path 118.

Color scan converter 108, which may also be used to interpolate scan line information obtained from color flow processor 104, then transmits color Doppler information via signal path 118 to video processor 127 for display on video display 130. Video processor 127 typically includes so-called decision circuits to choose whether a given specific part of the two-dimensional image has color information resulting from flow or whether it only has echo information from static tissue. If flow is present, the color information is displayed at the correct point in the image rather than the black and white image information.

The Color Flow Processor

Figure 2:
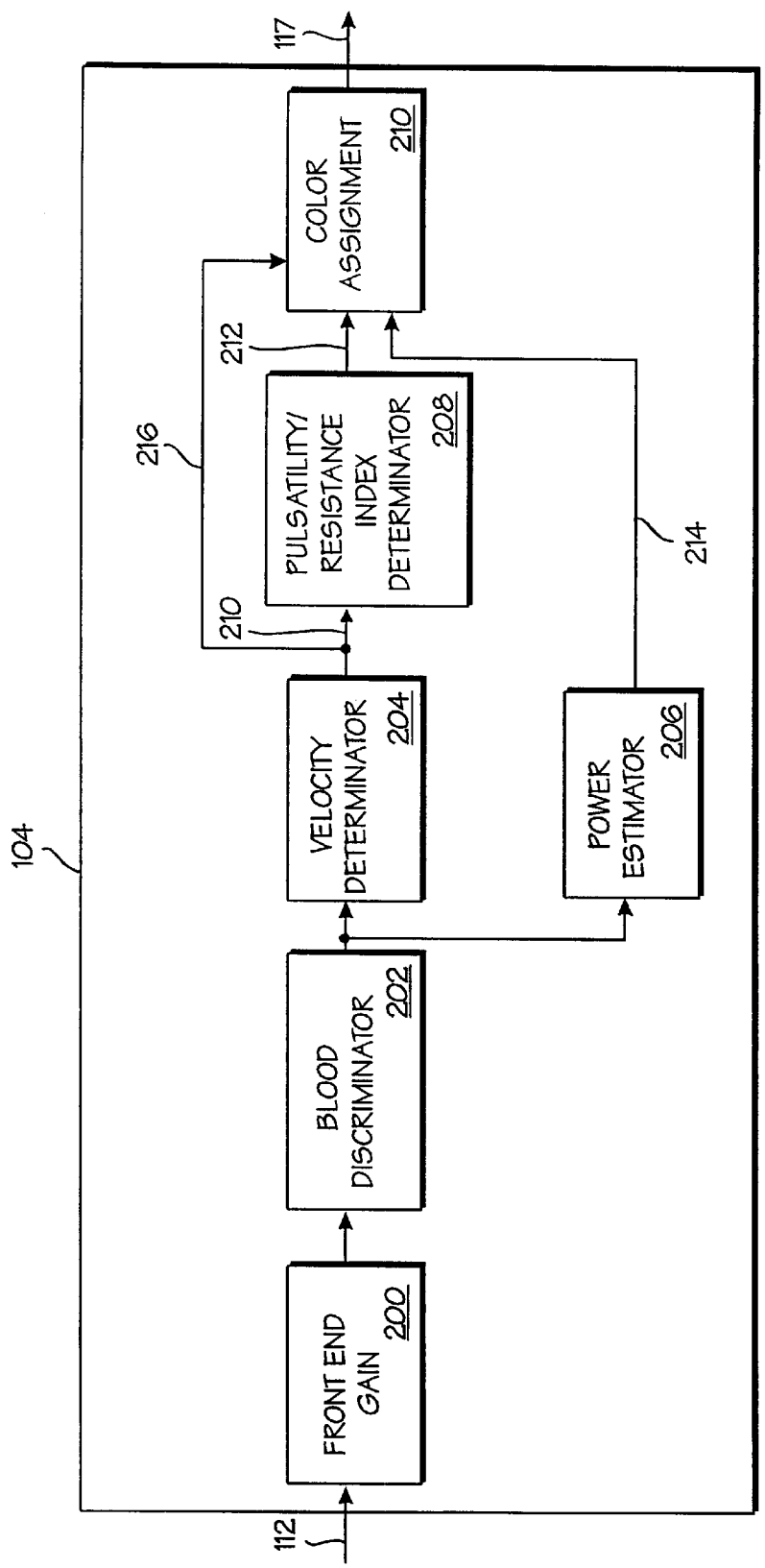
FIG. 2 shows a block diagram of functional blocks within the color flow processor of the ultrasonic imaging system.

FIG. 2 illustrates functional blocks which are contained within color flow processor 104 for the discrimination between veins and arteries in real-time in living subjects. The color flow processor 104 in implemented embodiments of the present invention uses a pulsatility/resistance index determination circuit 208 which discriminates between veins and arteries by determining the pulsatility of the flow of blood. Because blood flow within arteries is substantially more pulsatile than the flow within a vein, ranges of computed pulsatility can be assigned to different colors to identify whether flow is within an artery or a vein. Thus, flow identified as having a first range of pulsatility can be identified as an artery and flow having second range of pulsatility (which is typically less than the first range) can be identified as a vein.

Each of the blocks in FIG. 2 may be viewed as functions and/or dedicated circuitry within color flow processor 104 and are generally implemented using a combination of existing hardware within color flow processor and executable routines which are loaded from non-volatile storage (e.g., a computer system disk) into volatile memory and executed at run-time. However, these may also be implemented using discrete circuitry, firmware, or other dedicated circuitry. Color flow processor 104 includes a front end gain 200 which is applied to the signals received over lines 112 to raise the flow signal to an amplitude which may be detected by blood discriminator 202. Blood discriminator 202 is applied to the signal so that tissue is discriminated from blood flow (or other flow of material) within the living organism.

The processed signals are then passed to the velocity determinator 204, and, in another embodiment, a power estimator 206. The velocity determinator 204 uses the signal information received from blood discriminator 202 to determine a frequency shift or a velocity estimate of the moving flow. This may be done using any number of prior techniques, including the Aloka auto correlation algorithm. Power estimator 206 determines the power of the blood flow signals, and this information may be made available to color assignment circuit 210 for assignment of color values based upon power in other embodiments.

Velocity determinator 204 transmits the velocity or frequency shift information over signal lines 210 to pulsatility/resistance index determinator 208. Pulsatility/resistance index determinator 208 determines an estimated pulsatility/resistance index which will be used for assignment of a color which will be displayed upon the system display 130 in two-dimensions in order to allow a clinician to discriminate arteries from veins in a living subject. The estimated pulsatility/resistance index is passed to color assignment module 210 over signal lines 212. A color is assigned by color assignment module 210 according to the pulsatility/resistance index received over lines 212, the velocity information received over signal lines 216 and/or the power signals received over signal lines 214 according to the implementation. Color assignment circuit 210 assigns an appropriate color to the two-dimensional location, which information is then passed over signal lines 117 to color scan converter 108.

The Pulsatility Index Determinator

Pulsatility/resistance index determinator 208 generates an estimated pulsatility index Pi, which is used to generate a color to distinguish different pulsatility ranges. These ranges may includes those which are typically found in veins or arteries in order to discriminate between them. A pulsatility index (PI) is defined as:

$$PI = \frac{PS - MDD}{TAP}$$

where PS is the Peak Systole, MDD is the Maximum Diastolic Deflection, and TAP is the Time Averaged Peak. The values used in the computation of the pulsatility index made be either frequencies or velocities since the determined ratio will be unaffected by the correction angle. Thus, the pulsatility index is entirely angle independent, unlike traditional Doppler ultrasound. The definition of a pulsatility index PI has the shortcoming that peak frequencies are used, and velocity estimation technique in typical flow processors estimate mean frequencies. Therefore, in implemented embodiments the present invention, an estimate Pi of the pulsatility index PI is calculated and transmitted over signal lines 212 by pulsatility/resistance index determinator 208. Pi is defined as:

$$Pi = \frac{\text{variation}}{\text{average}}$$

wherein the variation and the average are both calculated using any of a number of measures which will be discussed below.

Figure 3:
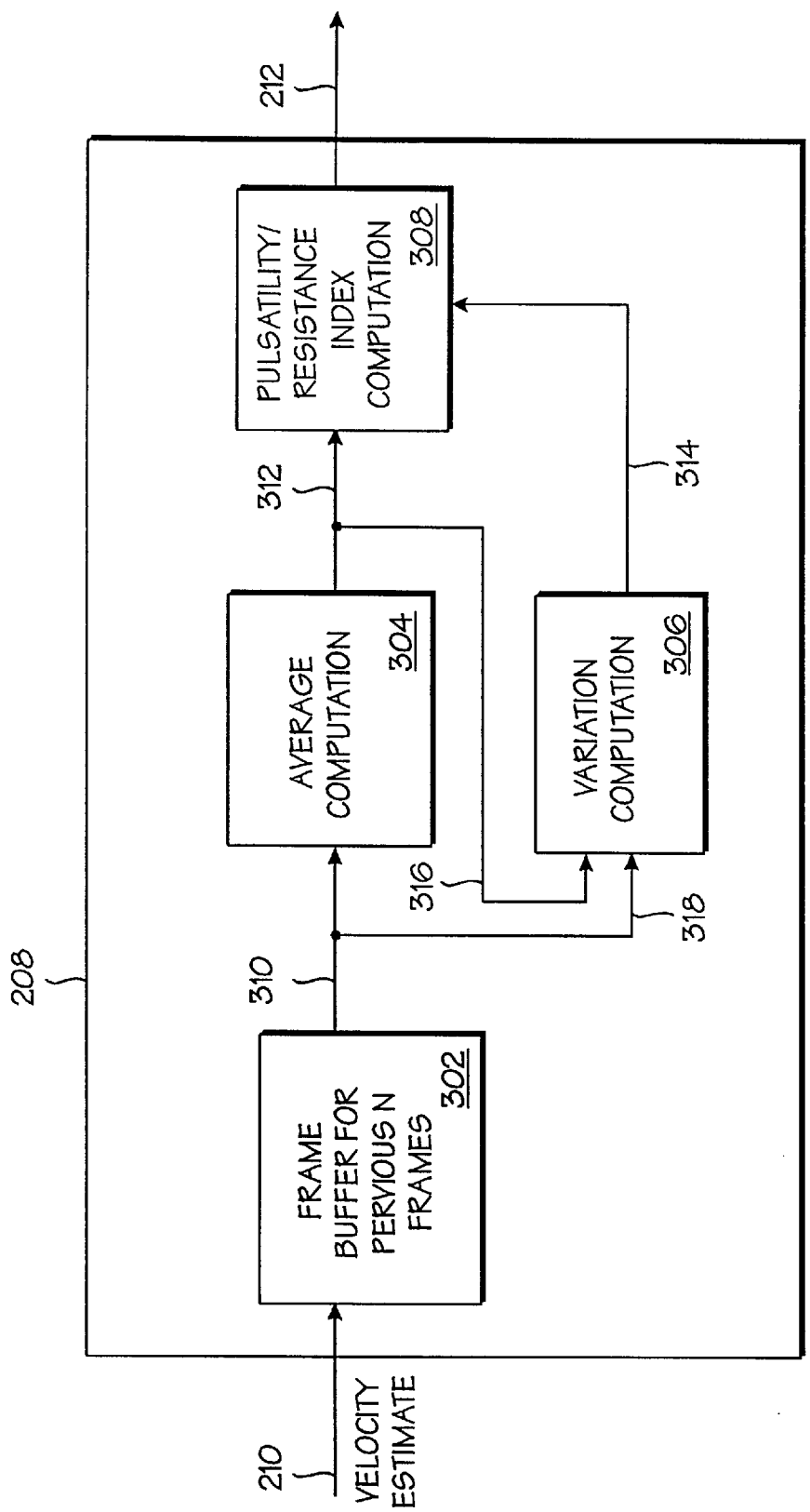
FIG. 3 illustrates details of the pulsatility/resistance index determinator.

As shown on FIG. 3, the pulsatility/resistance index computation module 208 receives the velocity estimate over signal lines 210, which is stored in a frame buffer 302 for previous N frames displayed on the ultrasonic imaging system's display. In another embodiment, it may be frequency shift information because Pi is angle independent and no angle correction has been performed. Pulsatility/resistance index determinator 208 further comprises an average computation module 304 and a variation computation module 306 each coupled to the frame buffer 302. Average computation module 304 may use any of a number of averaging techniques, including, but not limited to, median, mean, or root means squared (RMS) averages for a velocity at the given sample volume. In addition, the variation computation module 306 can generate a variation estimate over signal lines 314 also using any of a number of measures as will be further elaborated below. The variation computation circuit 306, in some embodiments, also uses the average computation module 304 in order to determine the variance of the velocity signals received over signal lines 210. Both the average computation module 304 and the variation computation module 306 are coupled to a pulsatility/resistance index computation module 308 which generates the estimated pulsatility index Pi. This index is then passed over signal lines 212 to the color assignment module 210.

The Resistance Index Determinator

Pulsatility/resistance index determinator 208 also generates an estimated resistance index Ri, which is used to generate a color to distinguish different resistance ranges. These ranges may also include those which are typically found in veins or arteries in order to discriminate between vascular bodies of lower and higher resistance. A resistance index (RI) is defined as:

$$RI = \frac{PS - ED}{PS}$$

where PS is the Peak Systole, and ED is the End Diastole. Like the pulsatility index PI, the resistance index RI also has the shortcoming that peak frequencies are used. Therefore, in implemented embodiments of the present invention, an estimate Ri of the resistance index RI is calculated and transmitted over signal lines 212 by resistance/pulsatility index determinator 208. Ri is defined as:

$$Ri = \frac{\text{unipolar variation}}{\text{maximum average}}$$

wherein the variation and the average are both calculated using any of the measures which will be discussed below.

As shown on FIG. 3, the module 208 receives the velocity estimate over signal lines 210, which is stored in a frame buffer 302 for previous N frames displayed on the ultrasonic imaging system's display. In another embodiment, it may be frequency shift information because both Pi and Ri are relatively angle independent. Module 208 further comprises an average computation module 304 and a variation computation module 306 each coupled to the frame buffer 302. Average computation module 304 may use any of a number of averaging techniques, including, but not limited to, median, mean, or root mean squared (RMS) averages for a velocity at the given sample volume. In addition, the variation computation module 306 can generate a unipolar variation estimate over signal lines 314 also using any of a number of measures as will be further elaborated below. The variation computation circuit 306, in some embodiments, also uses the average computation module 304 in order to determine the variance of the velocity signals received over signal lines 210. Both the average computation module 304 and the variation computation module 306 are coupled to a resistance index computation module 308 which generates the estimated indices Pi and Ri. These indices are then passed over signal lines 212 to the color assignment module 210.

Average Computation

Figure 4:
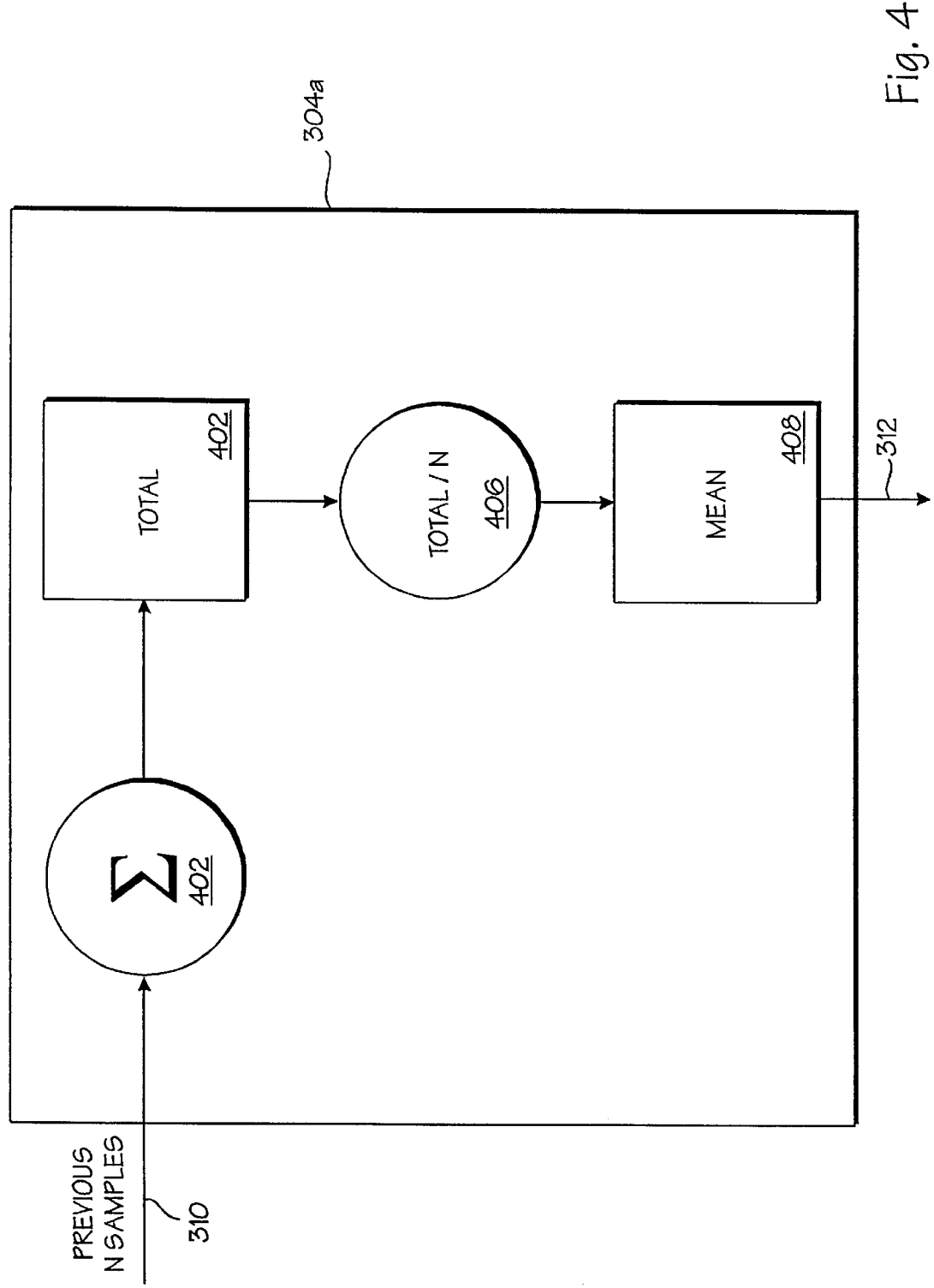
FIG. 4 illustrates one embodiment of a mean value calculator.

In a first embodiment, average calculation is performed by a mean determination module 304a as shown in FIG. 4. A previous N samples is received over signal lines 310 which is input to a summation circuit 402. The summation circuit 402 communicates with the register 404 to sum the previous N samples. The sum of the previous N samples is then divided by the number of samples N by divider 406. The resulting mean is then placed into a register or other means 408 for provision of the mean over signal lines 312.

Figure 5:
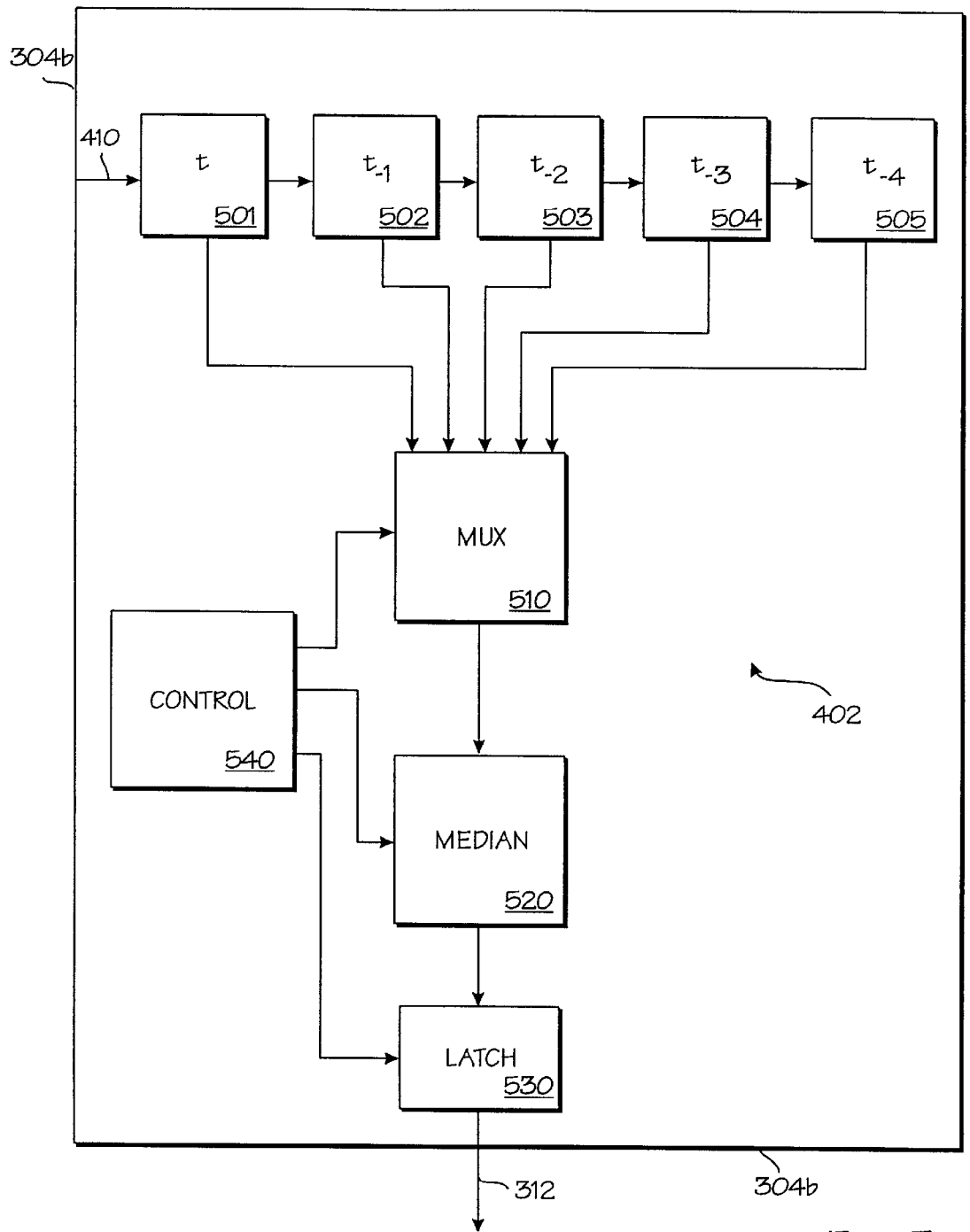
FIG. 5 shows a median value calculator

FIG. 5 illustrates an example of a median computation module or median filter 304b which may be used for determining the median of a set of N samples. One implementation of this median filter 304b may include a device having a plurality of components as illustrated in FIG. 5. In such a system, a window of a previous N samples (e.g., 5 as illustrated in this implementation) may be maintained in a plurality of memory elements 501–505. Each of the elements comprises a memory element for storing the temporally spaced samples and, as illustrated, each one is delayed by a single frame interval.

In this embodiment, samples are overlapped so that four samples from a previous iteration of the median filter are used, and only a single new sample is used in conjunction with the other four for detection of the median during a current iteration of the filter. Each of the memory elements may be coupled to multiplexer 510, for selection by a control circuit 540. The control circuit 540 may select each of the memory elements 501–505 sequentially, determining which is the median within the group of samples. This is placed into a second memory element 520. Once it has been determined which is the proper median signal from the memory elements 501–505, the resulting memory element 520 is loaded with the value, and the control unit 540 causes the latch 530 to allow the data to flow through to signal lines 312.

Figure 6:
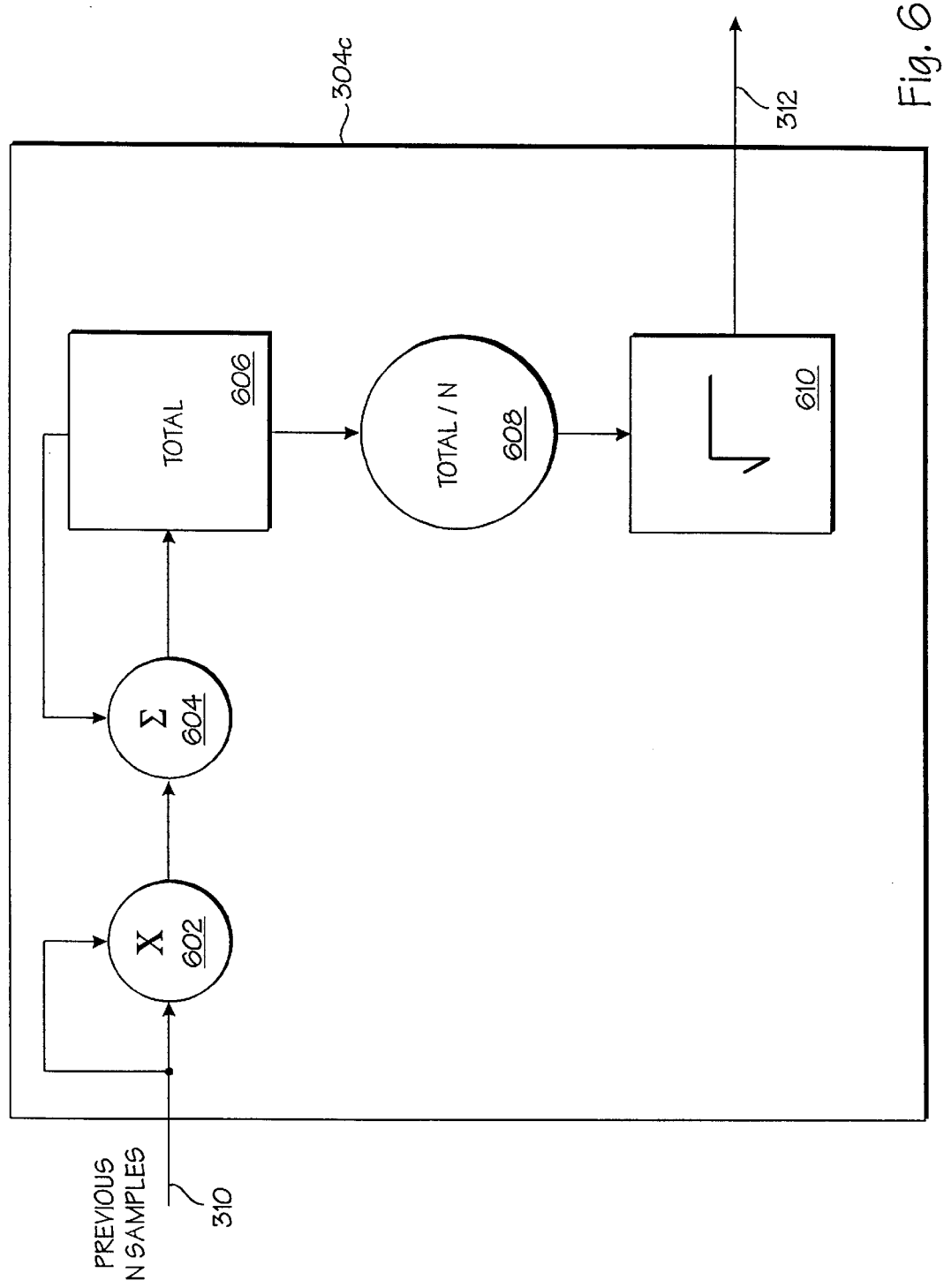
FIG. 6 shows a root mean squared (RMS) calculator.

FIG. 6 illustrates yet another embodiment 304c of the averaging module 304 shown in FIG. 3. 304c illustrates circuitry or modules which may be used for determining the root means squared (RMS) of input signals received over signal lines 310. RMS calculation module 304c includes a multiplier 602 which squares each of the N input signals. The squares of the input signals are then input to a summation module 604 which accumulates the sum of the N input signals into a register or other storage means 606. The total is then divided by a divider 608, in order to obtain an average of the squares of the N signals. The result of this operation is then passed to a square root calculator 610 which then determines the final RMS value which is transmitted over signal lines 312.

Variation Determinator

Figure 7:
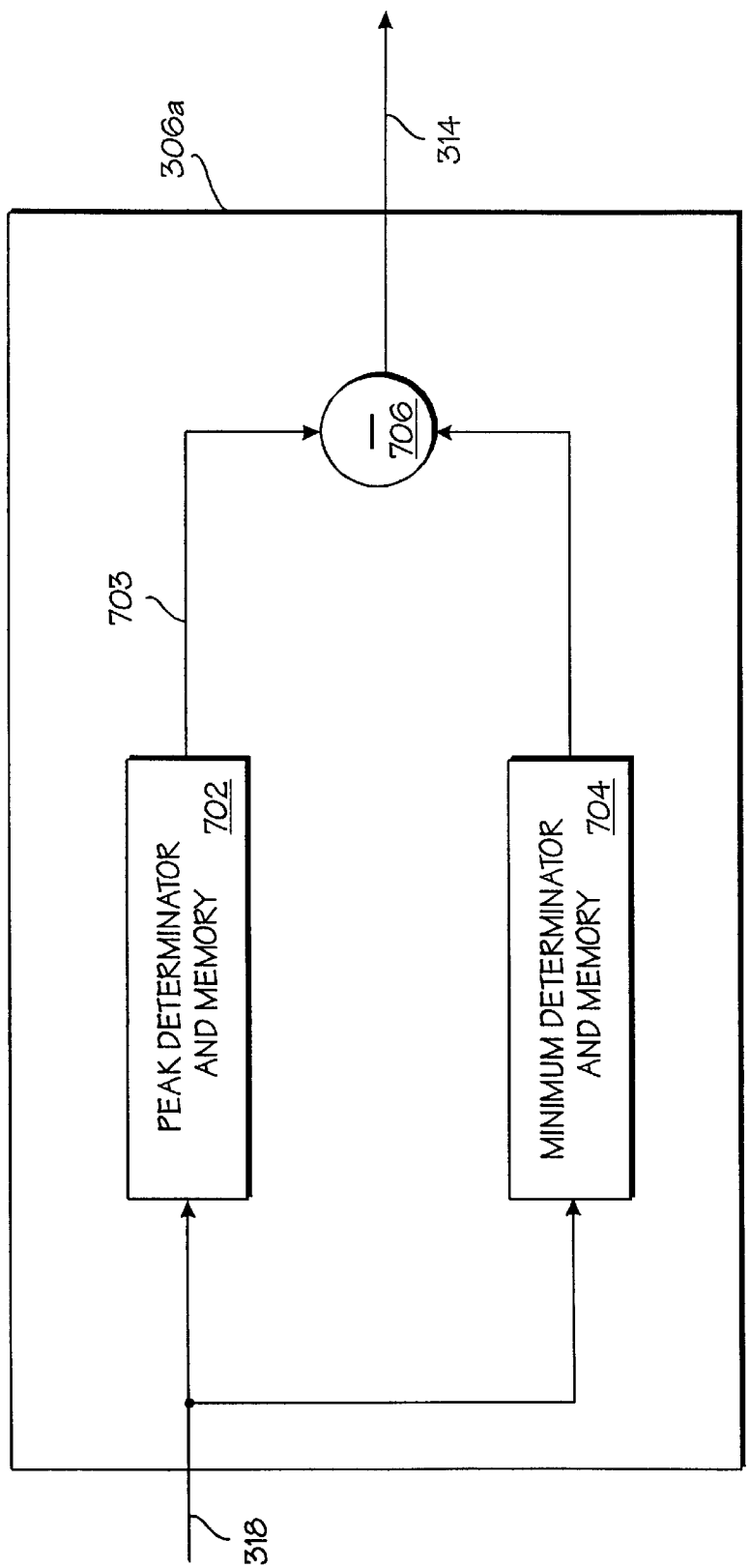
FIG. 7 shows one embodiment of a variance calculator.

FIG. 7 illustrates a first embodiment of 306a of variation determination module 306 shown in FIG. 3. This embodiment includes a peak determination module 702 which determines the peak velocity observed in the given sample volume using any known technique. 306a further comprises a minimum velocity determination module 704 which determines the minimum velocity observed in the sample volume. These two values are input into a difference module 706 which then generates the resulting variation estimate over signal lines 314.

Note that in this first embodiment 306a of the variation determination circuit that the estimate of pulsatility/resistance index Pi closely approximates PI, however, it does suffer from some shortcomings. Using a minimum velocity as an estimate of the maximum diastolic deflection (MDD) term suffers from a shortcoming in ultrasonic imaging systems because the minimum velocity is frequently zero due to "drop outs" which occur within the sampled signals. In addition, the peak determination module 702 and the minimum determination module 704 both generate single values which may be noisy. Thus, 306a may have certain undesirable shortcomings which prevents its implementation in real-world circumstances.

In a second embodiment 306b as shown in FIG. 8, instead of a minimum determination module 704, this embodiment uses an average value carried on signal lines 316 such as that generated by the median calculation module 304b in order to determine the variation estimate. The peak signal carried on signal lines 703 and the average carried on lines 316 are input to a difference circuit 804, in order to determine a variation estimate. This estimate is then passed over signal lines 314 to the pulsatility/resistance index computation module 308. Note that the same averaging circuit as used for the average estimate in the denominator may not necessarily be used by the variation estimation circuit 306b, however, it reduces complexity in the color flow processor 104. In an alternative embodiment, another average measure (e.g., a mean) may be used.

FIG. 9 shows a third embodiment 306c of the variation determination module 306. FIG. 9 illustrates the determination of the standard deviation ρ which is calculated based upon the current velocity or frequency shift stored in a register or other means 902, and a mean estimate (or other average), such as that calculated by mean determinator 304a from a previous N samples. The difference between the current velocity and the mean is determined by difference circuit 904. The difference is then squared by a multiplier 906, for example, and the sum of the previous N frames' differences are stored in a memory 908. The sum of all these differences is determined by summer 910, wherein the total is stored in a register or other storage means 912. The total is provided to the divider 914 which divides the total by the number of samples N used to form the sum. The standard deviation ρ is then generated by determining the square root of the value stored in register 912, such as by a square root determinator 916, and provided over signal lines 314.

In yet another embodiment, circuit 306d may be used for generation of the variation term. In a first embodiment, 306d can generate an estimate of the standard deviation term ρ generated by circuit 306c. In this embodiment, the circuit includes an auto correlator 1002 which operates upon velocity or frequency shift estimates received over signal lines 318. The auto correlator 1002 may be any number of prior art auto correlators which are commercially available. Auto correlator 1002 can be coupled to a correlation value test module 1004 which determines which values from the auto correlator will be used as the variation estimate. A square root of the tested for value is determined by module 1008, and is allowed to pass through via latch 1006 over signal lines 314 for the variation estimate.

Figure 10A:
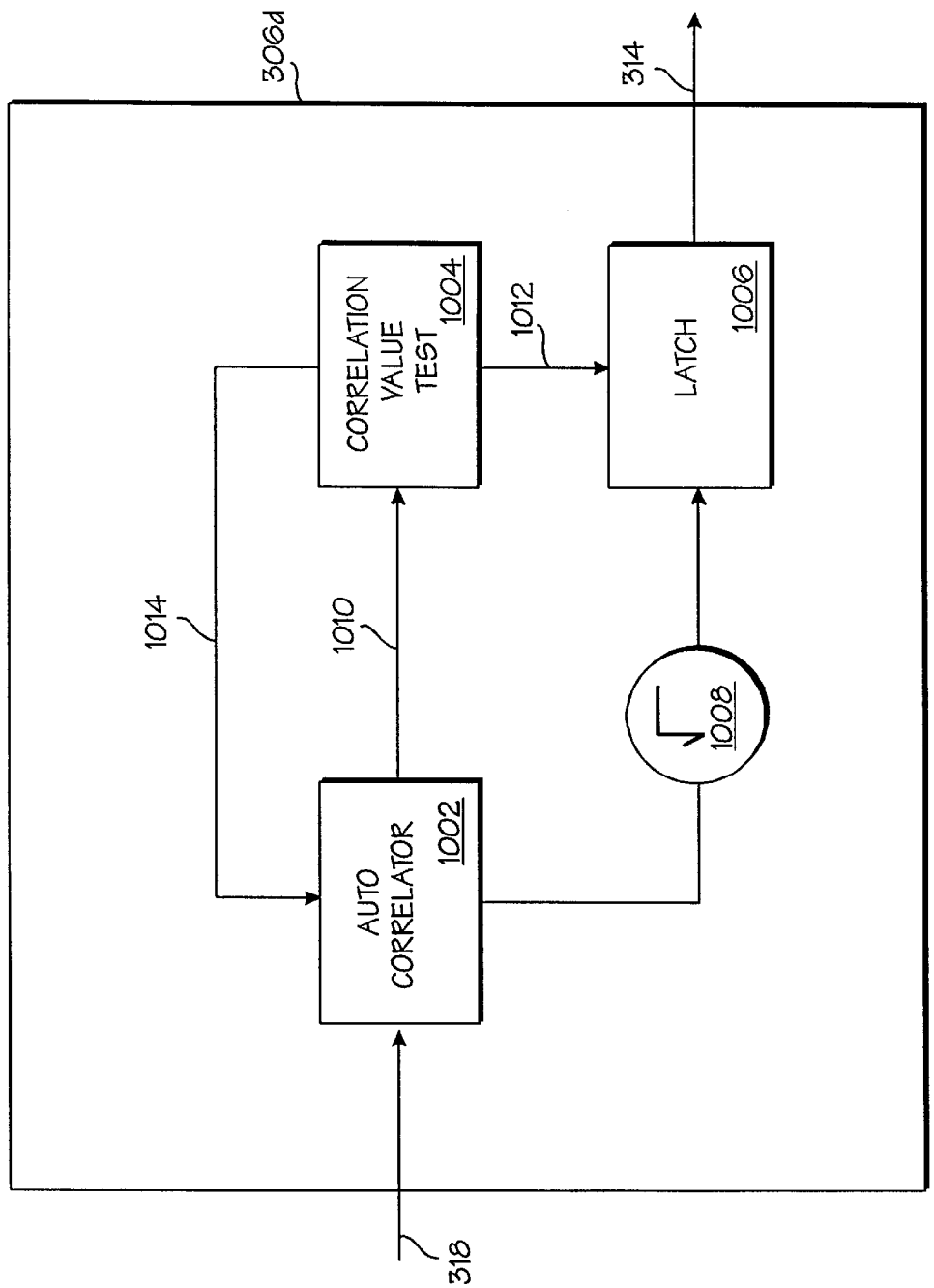
FIG. 10a shows yet another embodiment of a variance calculator using an auto correlator.
Figure 10B:
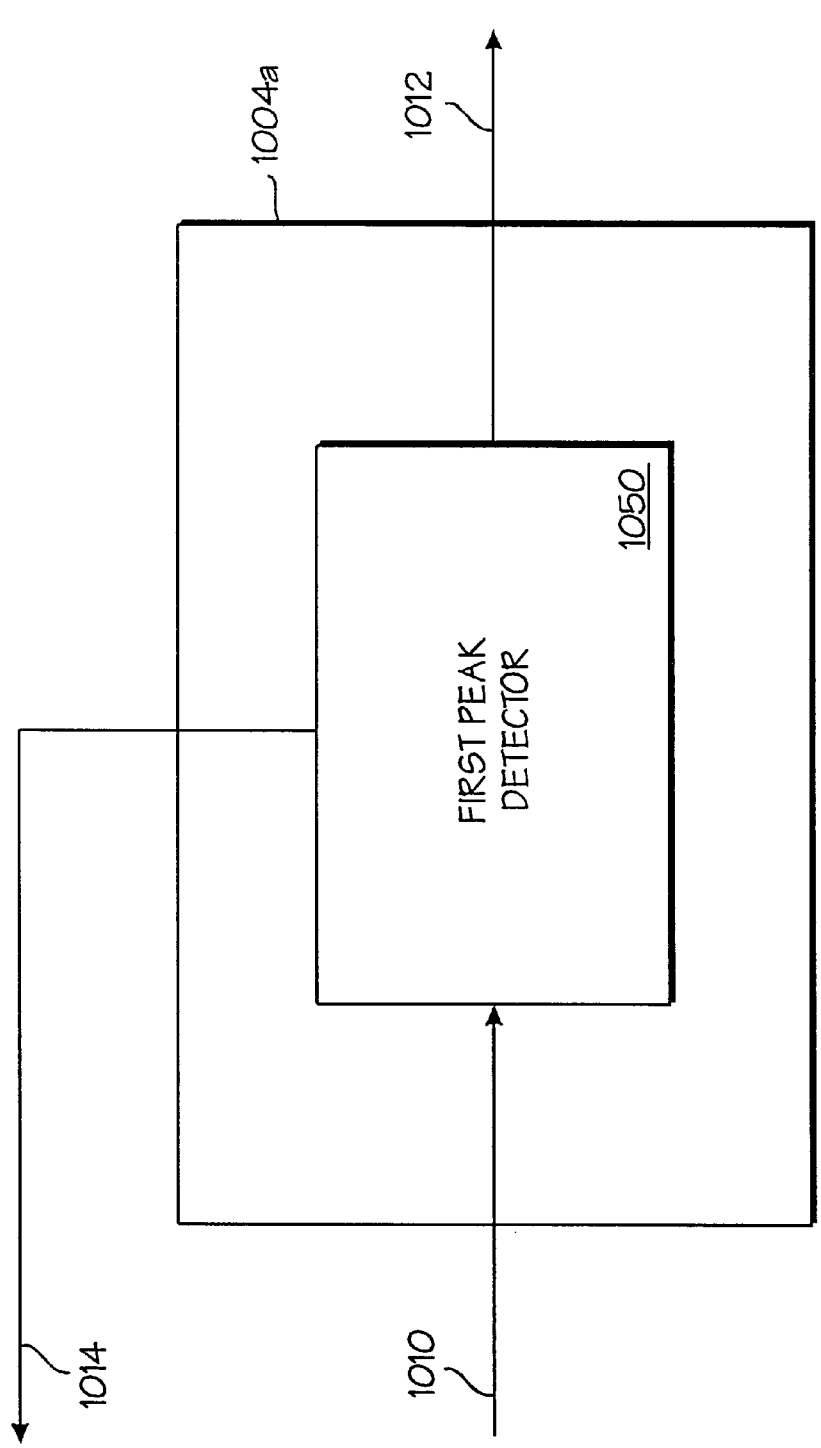

In a first alternative embodiment of the circuit 306d, the correlation value test module 1004a can locate the first peak of the auto correlator via a circuit such as 1050 shown in FIG. 10b. In this instance, the square root of the first peak approximates the standard deviation ρ.

Figure 10C:
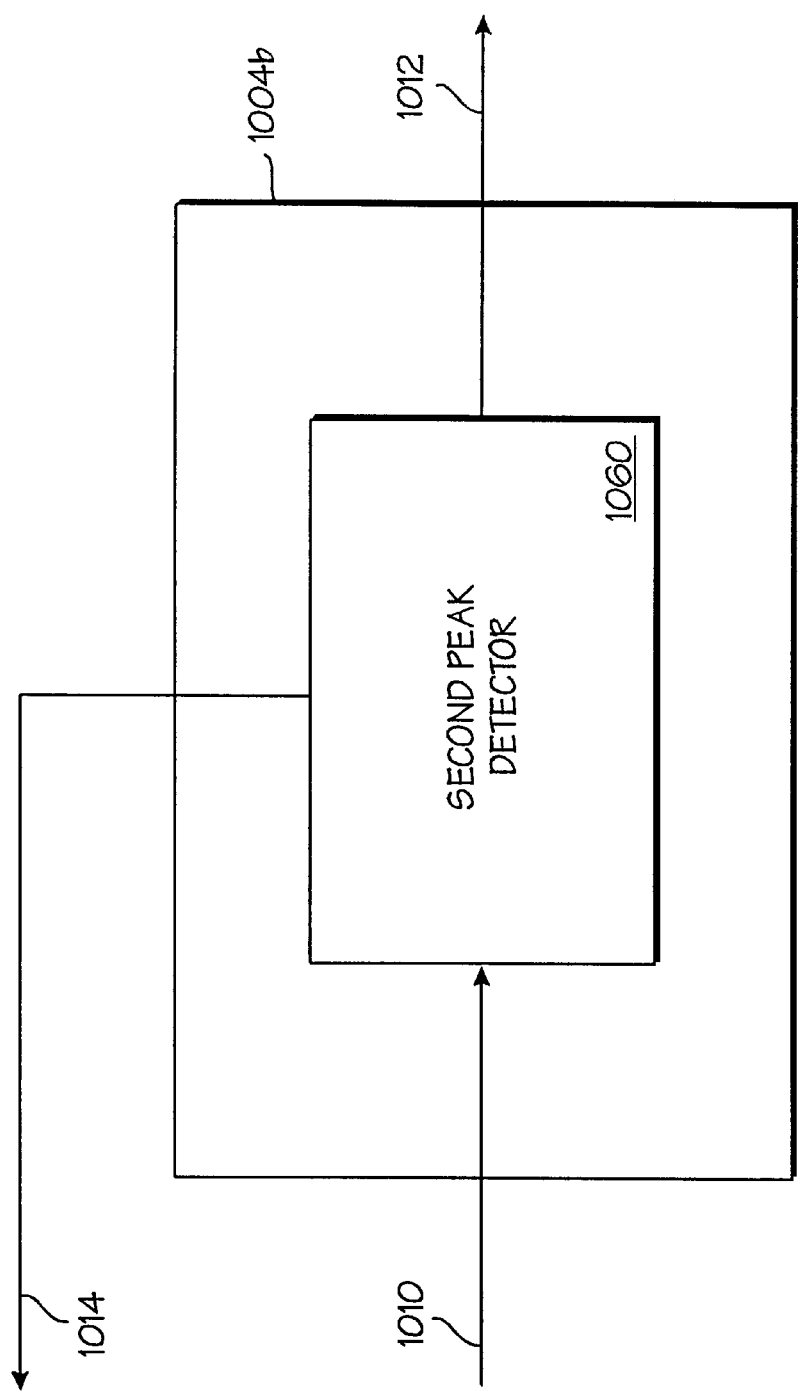

In yet another embodiment, as illustrated in FIG. 10c, the correlation value test circuit 1004 can include a second peak detector 1060 in the embodiment 1004b which provides the value at the second peak or lag from the auto correlator 1002. In this embodiment, the value provided by module 306d over signal lines 314 is $\sqrt{C\rho^2}$, wherein C is equal to unity for a perfectly periodic signal. The location of this peak can be inspected to see if it corresponds to a reasonable cardiac rate. Because arteries will show a correlation peak at the cardiac rate, the term $C\rho^2$ generated by module 1004b and the resulting value $\sqrt{C\rho^2}$ provided by module 306d, in this embodiment, is especially useful for discriminating between venous and arterial flow.

Estimated Pulsatility/Resistance Index Computation

Figure 11:
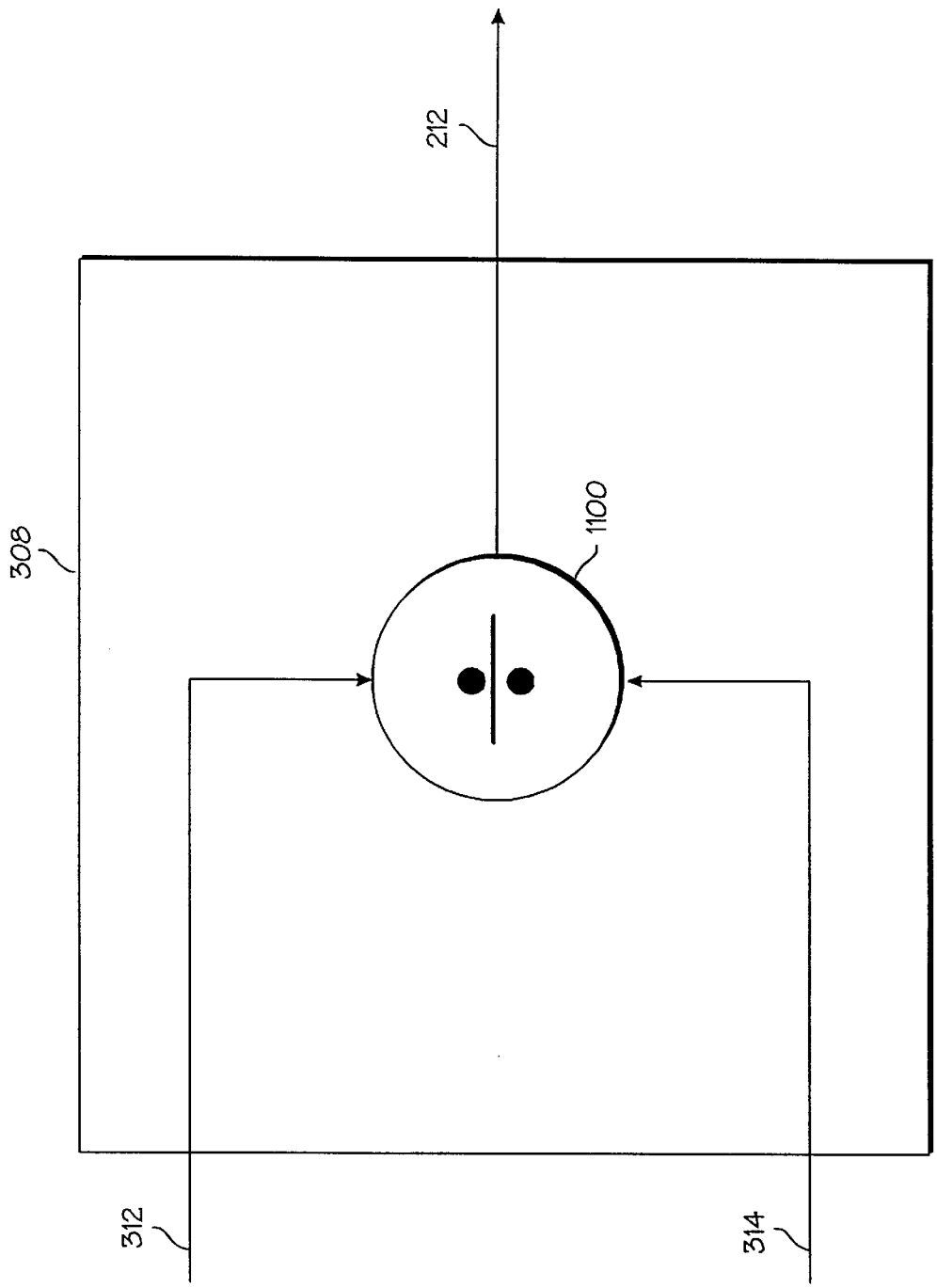
FIG. 11 shows an embodiment of a pulsatility/resistance index calculator.
Figure 12A:
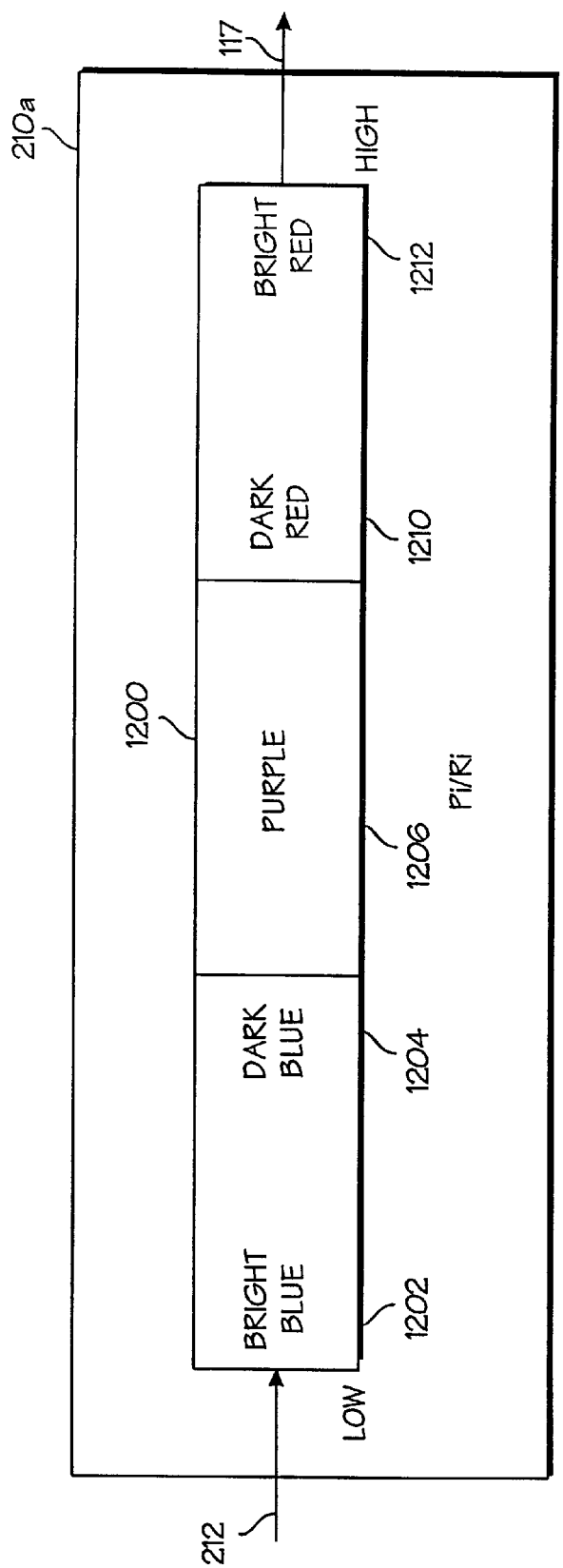

FIG. 11 illustrates the estimated pulsatility/resistance index computation module 308 shown in FIG. 3. Because this module merely computes a ratio, in this embodiment, the circuit includes a divider 1100 which receives as inputs the average and variation estimates received over lines 312 and 314. The ration of the variation divided by the average is then provided as the estimated pulsatility/resistance index Pi over signal lines 212. Other ways to generate the ratio of the variation term over the average term are contemplated within the scope of the present invention, such as shift operations wherein the average term is a power of two.

Although a variety of computations of averages and variation terms have been described above any of which may be used in combination with any of the others, in a first embodiment, the computation of Pi is as follows:

$$Pi = \frac{\sigma}{TAM}$$

wherein ρ is the computed variation term (e.g. the standard deviation) and TAM is the Time Averaged Mean. In this embodiment, the signal to noise problem has been addressed because the standard deviation ρ is a better estimate of the variation than the terms used in the computation of PI. This is because of the drop out problem inherent in the MDD term due to it's reliance on a single sample. The use of the mean, however, also suffers from the drop out problem and therefore biases the mean somewhat.

In yet another embodiment, the computation of the estimated pulsatility/resistance index Pi for unipolar cardiac waveform is as follows:

$$Pi = \frac{max - med}{med}$$

wherein max is the maximum detected frequency and med is the median frequency both calculated in a moving window. Using the median instead of the MDD term in the calculation of Pi is appropriate most of the time because it is a very stable term and it is usually a reasonable estimate of MMD for typical unipolar cardiac waveforms. For bipolar cardiac waveforms, the estimates pulsatility index Pi is as follows:

$$Pi = \frac{max - min}{med}$$

where min is the minimum detected frequencies. For both unipolar and bipolar cardiac waveforms, the estimated resistance index Ri is as follows:

$$Ri = \frac{max - min}{max}$$

Replacing the TAM term with the median causes some large differences between PI and Pi because the median is typically smaller then the average for very pulsatile waveforms. This will therefore make the Pi value systematically larger than PI. If, as in implemented embodiments of the present invention, the values are used for the determination of a color index and used in a two-dimensional real-time survey mode by clinician, this is not typically an issue since it is not used for a precise measurement but rather for a color which is displayed. Thus, using the median has the advantage that is very stable both in the sense that it has low noise, and is not sensitive to length or phase of the cardiac cycle in the subject.

Yet another advantage of determining the median instead of the mean is useful for rejecting mostly high pulsatility values near the edges of blood vessels. The walls of both veins and arteries often move due to heart motion. This motion can move the vessel wall in and out of a fixed sample volume, which is synchronized with the cardiac cycle. The result can be a waveform that shows no flow for most of the cycle and high flow for part of the cycle. Similar effects occurs in tissue wherein motion during systole causes the velocities to get through the wall filter of the flow processor. Displaying only those sample volumes whose median is non zero (above the minimum detectable frequency) prevents these regions from showing up as areas of high pulsatility.

Color Assignment

Different embodiments of color assignment module 210 shown in FIG. 2 are illustrated and discussed with reference to FIGS. 12a–16. In a first embodiment 210a illustrated in FIG. 12a, a direct mapping of pulsatility and/or resistance, using a look-up table or array 1200, can be used. For any of the FIGS. 12a–16, pulsatility or resistance may be used for determining a color, along with corresponding changes to be discussed. For example, the array 1200 would have a plurality of memory locations directly addressed by the signal 212 received over lines 212 of the estimated pulsatility index Pi/Ri. For example, a first range ranging from a first value 1202 to a second value 1204 at the low end of pulsatility or resistance index range may map to a range of a blue color. Bright blue 1202 would be the lowest estimated pulsatility/resistance index and dark blue 1204 would be some Pi threshold beyond which venous flow is no longer clearly present.

A second range from 1210–1212 may include the threshold 1210 above which arterial flow is clearly identified, and the maximum value of the pulsatility index Pi 1212. This may be assigned to a range of red color values to in order to clearly identify arterial flow.

An intermediate color such as purple may be used in an intermediate range 1206 between the first and second ranges wherein neither venous nor arterial flow is clearly present according to the estimated pulsatility index Pi. At any rate, the color assignment which is determined by a look-up table or array 1200 is passed over signal lines 117 to color scan converter 108.

FIG. 12b illustrates a second embodiment of the one-dimensional lookup table 210a which contains a different color mapping. This is essentially the same as the lookup table 1200 except that it ranges from blue to yellow instead of from blue to red. All of the maps displaying resistance can benefit by the large number of colors to be assigned from blue to yellow rather that blue to red for added discrimination. This lookup table 1220 can be used for display of the pulsatility index Pi or the resistance index Ri. As shown in the lookup table 1220, the color range ranges from a low pulsatility or resistance index 1222 wherein a blue color is assigned. At the high end 1232 of the pulsatility or resistance index range, a yellow color is assigned. At the intermediate region 1226 in lookup table 1220, the color assignment is red.

Yet another embodiment of the lookup table 210a is shown in FIG. 12c. This is one color map which would not be useful for the resistance index Ri since the definition of Ri precludes a bipolar value. This comprises a one-dimensional lookup table 1240 which can be used for displaying the pulsatility index Pi. For a unipolar pulsatility index Pi, from a low value 1242 to a high value 1250, the color ranges from a blue to a yellow color similar to the lookup table 1220. Once the value transitions into a bipolar range between 1250 and 1252, the presence of reverse flow is indicated on the display using a green color. Again, these values are passed over signal lines 117 to color scan converter 108 for display of the appropriate color upon the system display 130.

Figure 13:
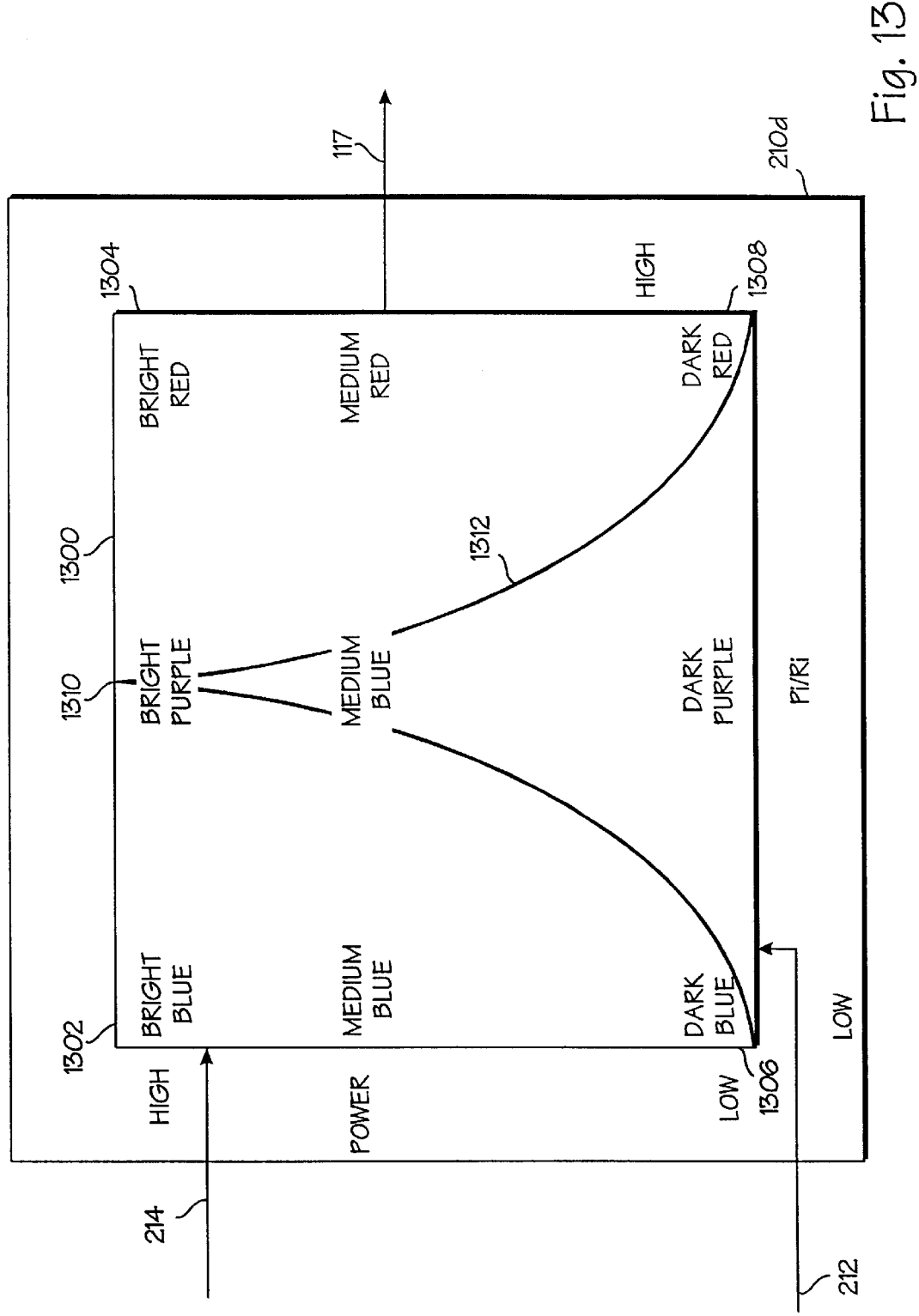

Another embodiment of the color assignment module 210 is shown as 210b in FIG. 13. In this embodiment, a two-dimensional look-up table 1300 may be used, which is addressed by the pulsatility index Pi (or Ri) carried on signal lines 212 as well as a power estimate of the signal carried on lines 214. FIGS. 13–16 can also be used for displaying the resistance index Ri as well, with the modification of the blue to yellow color range for the horizontal axis (e.g., as shown in FIGS. 15 and 16). Thus, this two-dimensional array has its color value determined by both power and pulsatility and/or resistance. The power shows the amount of the flow and the index shows the type of the flow. In one embodiment, a composite display might use power to control the intensity and the estimated pulsatility index Pi to control tint.

The two-dimensional array 1300 shown in FIG. 13, may use another type of map. For example, at the minimum pulsatility (or resistance) index the color may range from a dark blue at 1306, to a bright blue at 1302, wherein this range clearly delineates venous flow. For the maximum estimated pulsatility index Pi (or Ri) the color may range from a dark red at a minimum power level 1308 to a bright red at a maximum power level 1304.

A central region 1312 which comprises almost the entire pulsatility index range at minimum power levels, and almost none of the pulsatility index range at a maximum power level may be assigned to a third color value, such as purple. Again, this purple would range from a dark purple at minimum power levels to a bright purple at higher power levels. Again the resulting color assignment for the sample volume is then passed via signal lines 117 to scan converter 108.

In a third embodiment of color assignment module 210c, velocity or frequency shift information carried on signal lines 216 may be used to address a two-dimensional array 1400 which generates the color information. This two-dimensional array may be similar for absolute values of the frequency to the power versus pulsatility index map array 1300 in FIG. 13. In this embodiment, velocities or frequencies shifts are signed, and those approaching Nyquist (both positive and negative) are represented in bright shades. Those approaching zero 1412 in frequency shift or velocity are represented in dark colors. Also, the central region 1410 of the two-dimensional array is used for a color which represents ambiguous information, that is, that which is neither clearly venous nor clearly arterial flow. Again this functions in a similar way to the table 1300 shown in FIG. 13 so that areas which are clearly venous and arterial flow are represented as such on the display, however, ambiguous information is displayed in a third color (e.g. purple). The brightness of the assigned color is based upon the absolute value of the velocity information for the signal.

Figure 14:
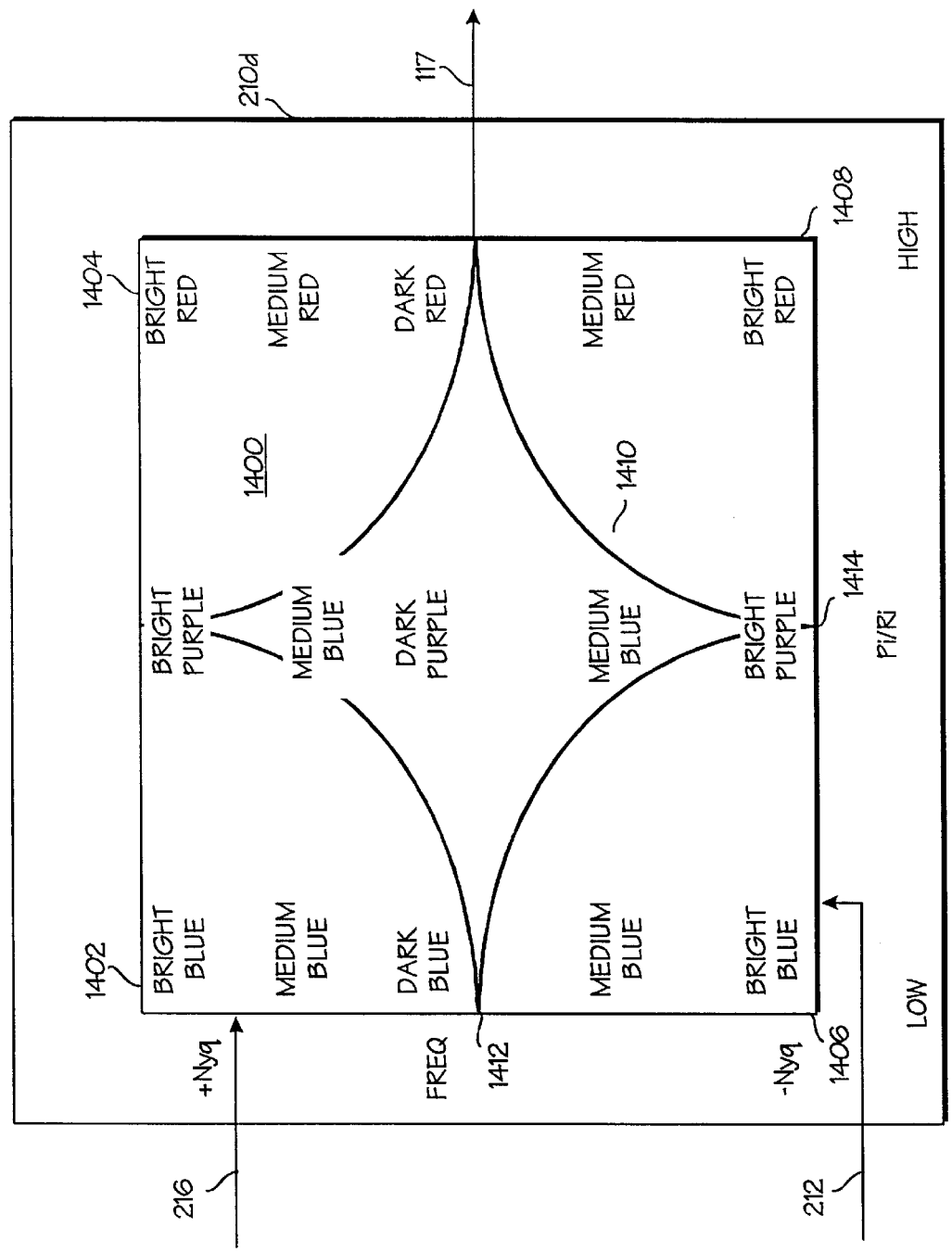
Figure 15:
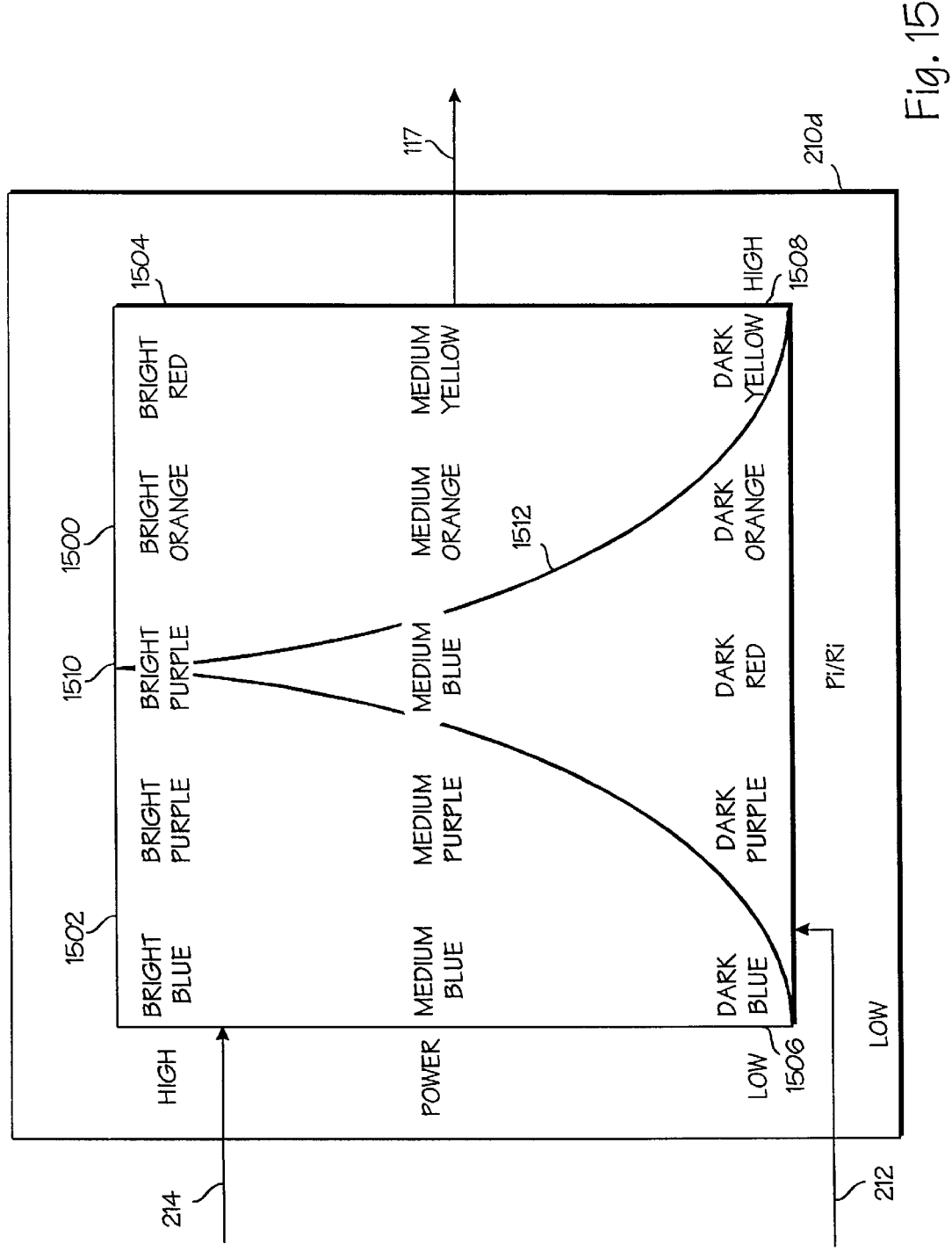

FIGS. 15 and 16 show similar color lookup tables to those illustrated in FIGS. 13 and 14 along with the corresponding increase in the color range to a maximum color value of yellow instead of red with red being an intermediate color. This provides the corresponding increase in discrimination between various pulsatility or resistance index values.

Thus, in conclusion, a method and apparatus for the display of pulsatility and/or resistance in two-dimensions, especially on a ultrasonic imaging system display has been described. Although the present invention has been described with reference to specific embodiments thereof, especially those illustrated in FIGS. 1–16, these should be viewed as illustrative only and do not limit the present invention. Other modifications of the described embodiments made may be without departing from the overall spirit and scope of the present invention. Thus, the present invention is only to be construed as limited by the appended claims.

What is claimed is:

1. A method in an ultrasonic system for displaying resistance or pulsatility indices of a flow material, said method comprising the steps of:

measuring a resistance or pulsatility index of said flow material from selected sampled points of said flow material;

displaying the measurement of said resistance or pulsatility index in a plurality of colors corresponding to a range of said measurement;

displaying the measurement of said resistance or pulsatility index in said plurality of colors in two dimensions in locations corresponding to said sampled points of said flow material.

2. The method of claim 1, further including the steps of:

measuring a power of a signal representing said flow material from said selected sampled points of said flow material;

displaying the measurement of said power in a plurality of colors corresponding to a range of said measurement of said power;

displaying the measurement of said power in said plurality of colors in two dimensions in locations corresponding to said sampled points of said flow material.

3. The method of claim 1, further including the steps of:

measuring a frequency-shift estimate of said flow material from said selected sampled points of said flow material;

displaying the measurement of said frequency-shift estimate in a plurality of colors corresponding to a range of said measurement of said frequency-shift estimate;

displaying the measurement of said frequency-shift estimate in said plurality of colors in two dimensions in locations corresponding to said sampled points of said flow material.

4. An ultrasonic system operable to display resistance or pulsatility indices of a flow material, said ultrasonic system comprising of:

a measurement unit to measure a resistance or pulsatility index of said flow material from selected sampled points of said flow material;

a display, coupled to said measurement unit, to display the measurement of said resistance or pulsatility index in a plurality of colors corresponding to a range of said measurement, and further to display the measurement of said resistance or pulsatility index in said plurality of colors in two dimensions in locations corresponding to said sampled points of said flow material.

5. The ultrasonic system of claim 4, wherein said measurement unit is further operable to measure a power of a signal representing said flow material from said selected sampled points of said flow material; and said display unit is further operable to display the measurement of said power in a plurality of colors corresponding to a range of said measurement of said power, and is further operable to display the measurement of said power in said plurality of colors in two dimensions in locations corresponding to said sampled points of said flow material.

6. The ultrasonic system of claim 4, wherein said first measurement unit is further operable to measure a frequency-shift of said flow material from said selected sampled points of said flow material; and said second unit is further operable to display the measurement of said frequency-shift in a plurality of colors corresponding to a range of said measurement of said frequency-shift, and is further operable to display the measurement of said frequency-shift in said plurality of colors in two dimensions in locations corresponding to said sampled points of said flow material.

7. An apparatus comprising a pulsatility index determination circuit for determining a pulsatility index of a flow of material by determining a ratio of a variation estimate of a velocity of said flow of material divided by a first average estimate of said velocity of said flow of material, wherein said variation estimate comprises a value selected from the group consisting of:

a. a difference between a peak velocity of said flow of material and a second average velocity of said flow of material;

b. a standard deviation s of said velocity of said flow of material;

c. a square root of a value at a first peak of an autocorrelator of said velocity of said flow of material, and d. a square root of a value at a second peak of said autocorrelator of said velocity of said flow of material; and a plusatility range detection circuit coupled to said resistance index determination circuit for detecting ranges of said resistance index;

a display circuit coupled to said pulsarity range detection for displaying said ranges of said resistance index in different colors in two dimensions according to locations of sampled points of said flow of material; and a power estimator for generating a power of a signal representing said flow of material, and said display circuit further includes a circuit for displaying said locations of said sampled points of said flow of material in different colors according to said ranges of said resistance index and said power of said signal.

8. An apparatus comprising a pulsatility index determination circuit for determining a pulsatility index of a flow of material by determining a ratio of a variation estimate of a velocity of said flow of material divided by a first average estimate of said velocity of said flow of material, wherein said variation estimate comprises a value selected from the group consisting of:

a. a difference between a peak velocity of said flow of material and a second average velocity of said flow of material;

b. a standard deviation s of said velocity of said flow of material;

c. a square root of a value at a first peak of an autocorrelator of said velocity of said flow of material, and d. a square root of a value at a second peak of said autocorrelator of said velocity of said flow of material; and a plusatility range detection circuit coupled to said resistance index determination circuit for detecting ranges of said resistance index;

a display circuit coupled to said pulsarity range detection for displaying said ranges of said resistance index in different colors in two dimensions according to locations of sampled points of said flow of material; and a velocity estimator for generating said velocity of said flow material, and said display circuit further includes a circuit for displaying said locations of said sampled points of said flow material in different colors according to said ranges of said resistance index and said velocity of said flow material.

* * * * *

UNITED STATES PATENT AND TRADEMARK OFFICE
CERTIFICATE OF CORRECTION

PATENT NO.    : 6,023,968
DATED         : February 15, 2000
INVENTOR(S)   : Spratt et al.

It is certified that error appears in the above-identified patent and that said Letters Patent is hereby corrected as shown below:

On the title page:

In [57] "ABSTRACT" after "deviation" delete "$\rho$" and insert --$\sigma$--.

In column 9, at line 3, delete "$\rho$" and insert --$\sigma$--.

In column 9, at line 16, delete "$\rho$" and insert --$\sigma$--.

In column 9, at line 35, delete "$\rho$" and insert --$\sigma$--.

In column 9, at line 42, delete "$\sqrt{C\rho^2}$" and insert --$\sqrt{C\sigma^2}$--.

In column 9, at line 46, delete "$C\rho^2$" and insert --$C\sigma^2$--.

In column 9, at line 47, delete "$\sqrt{C\rho^2}$" and insert --$\sqrt{C\sigma^2}$--.

In column 10, at line 5, delete "$\rho$" and insert --$\sigma$--.

In column 10, at line 8, delete "$\rho$" and insert --$\sigma$--.

Signed and Sealed this

First Day of May, 2001

Attest:

NICHOLAS P. GODICI

Attesting Officer    Acting Director of the United States Patent and Trademark Office